Nov. 12, 1968  A. C. PALATINUS  3,411,080
INTERMODULATION DISTORTION WAVE ANALYZER
Filed June 29, 1965  16 Sheets-Sheet 1

INVENTOR.
ANTHONY C. PALATINUS
BY Ernest J Weinberger
John M Pease
ATTORNEYS

INVENTOR.
ANTHONY C. PALATINUS

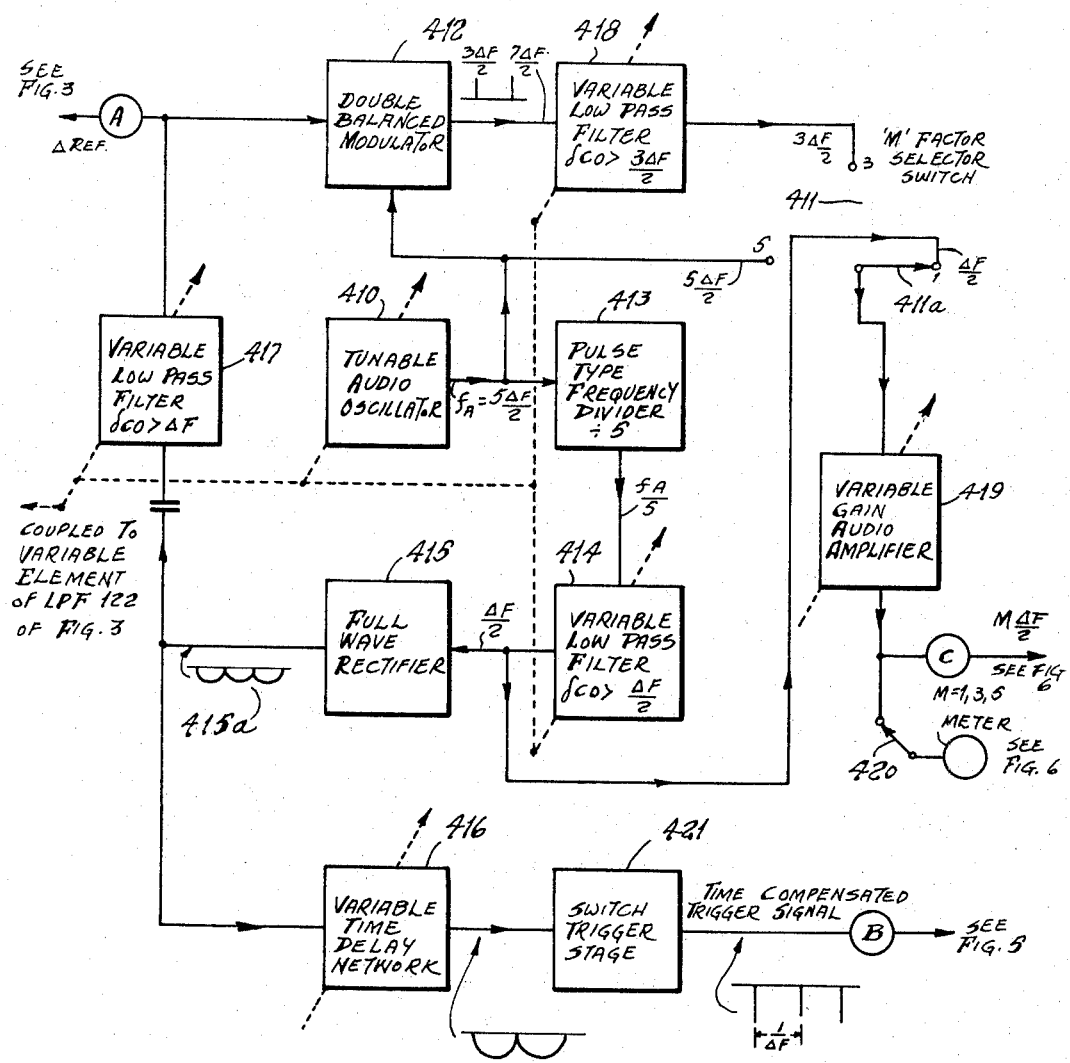

Nov. 12, 1968   A. C. PALATINUS   3,411,080
INTERMODULATION DISTORTION WAVE ANALYZER
Filed June 29, 1965   16 Sheets-Sheet 7

INVENTOR.
ANTHONY C. PALATINUS
BY Ernest J Weinberger
John M. Pearce
ATTORNEYS

INVENTOR.
ANTHONY C. PALATINUS

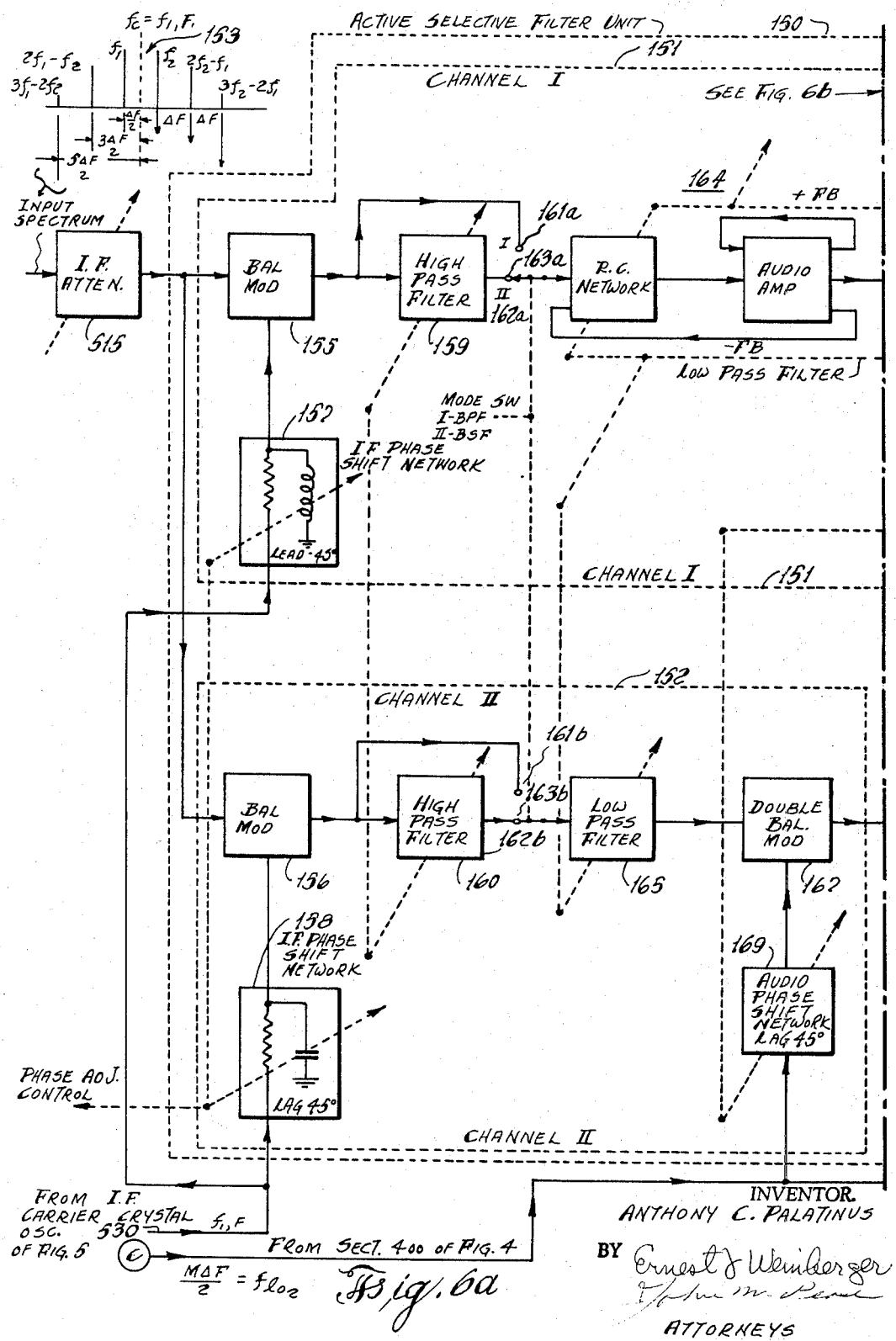

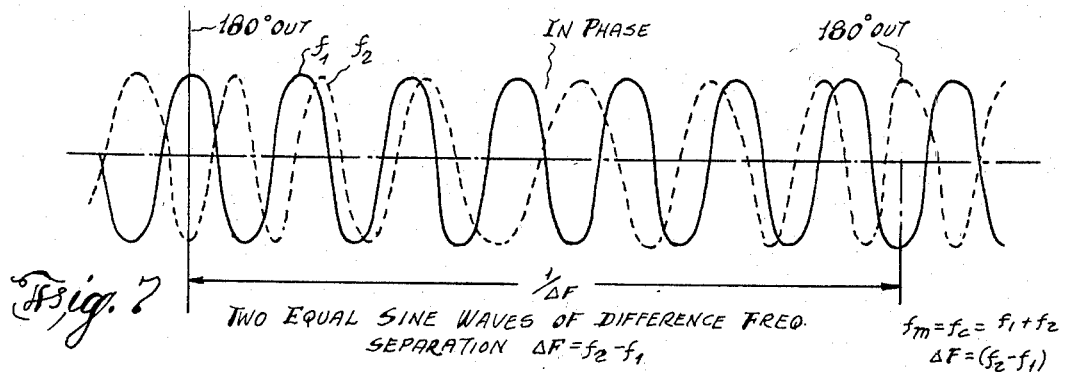
Fig. 7 TWO EQUAL SINE WAVES OF DIFFERENCE FREQ. SEPARATION $\Delta F = f_2 - f_1$
$f_m = f_c = f_1 + f_2$
$\Delta F = (f_2 - f_1)$
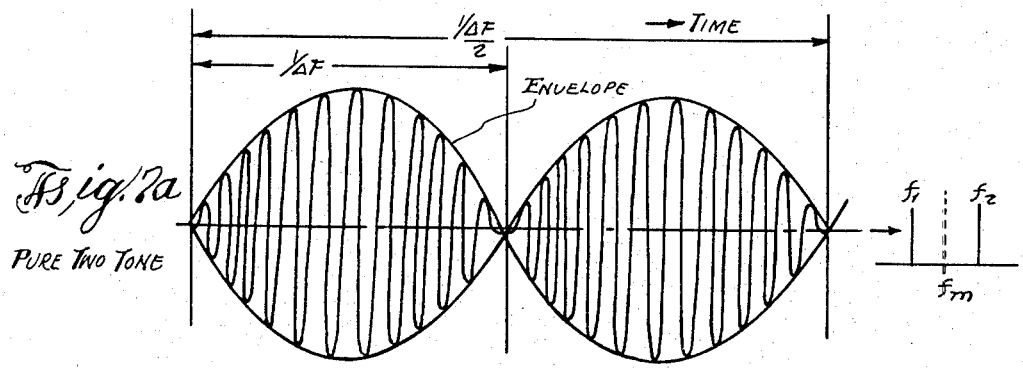
Fig. 7a PURE TWO TONE
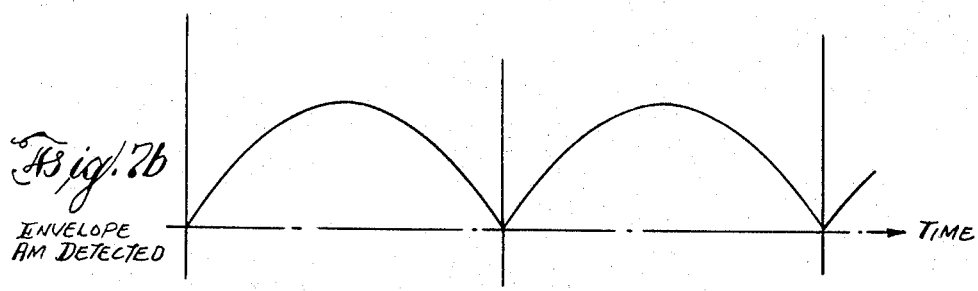
Fig. 7b ENVELOPE AM DETECTED
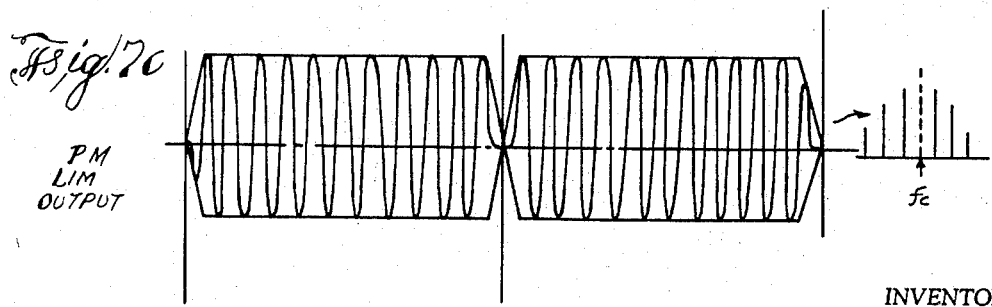
Fig. 7c PM LIM OUTPUT

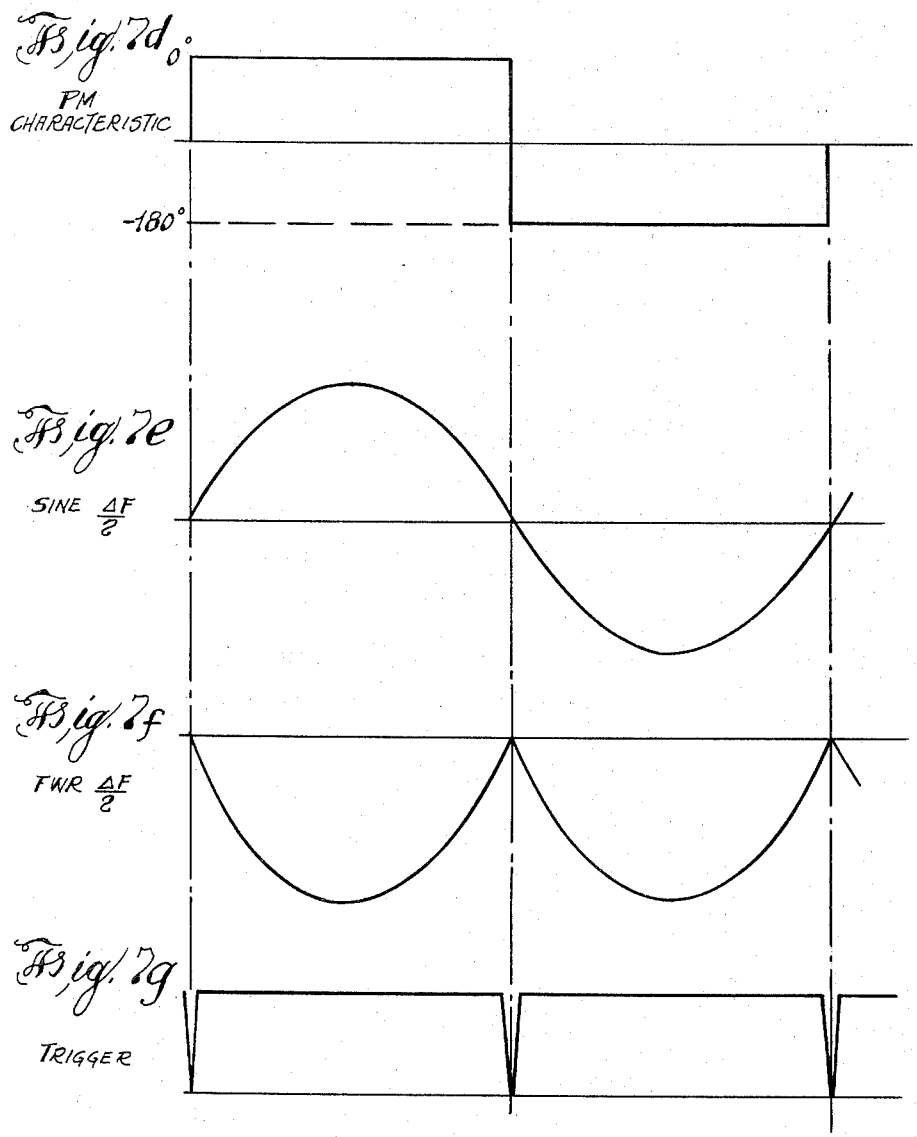

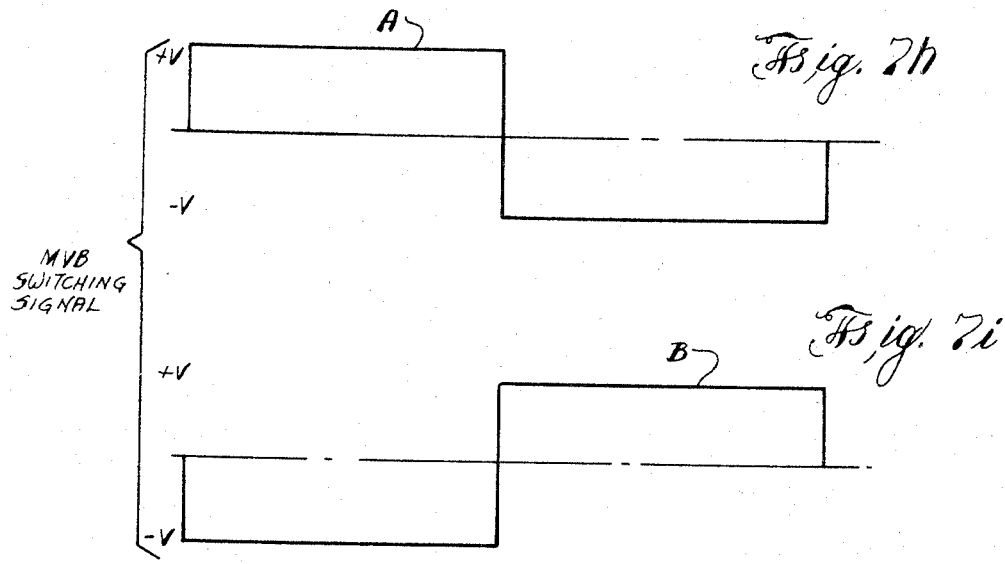
Fig. 7h
Fig. 7i
MVB SWITCHING SIGNAL
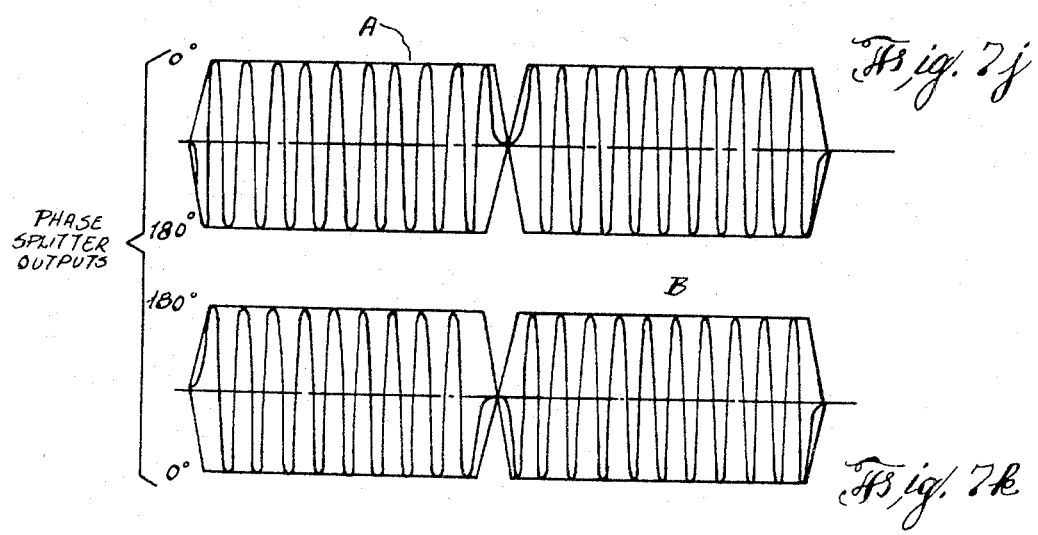
Fig. 7j
Fig. 7k
PHASE SPLITTER OUTPUTS
INVENTOR.
ANTHONY C. PALATINUS
BY
ATTORNEY

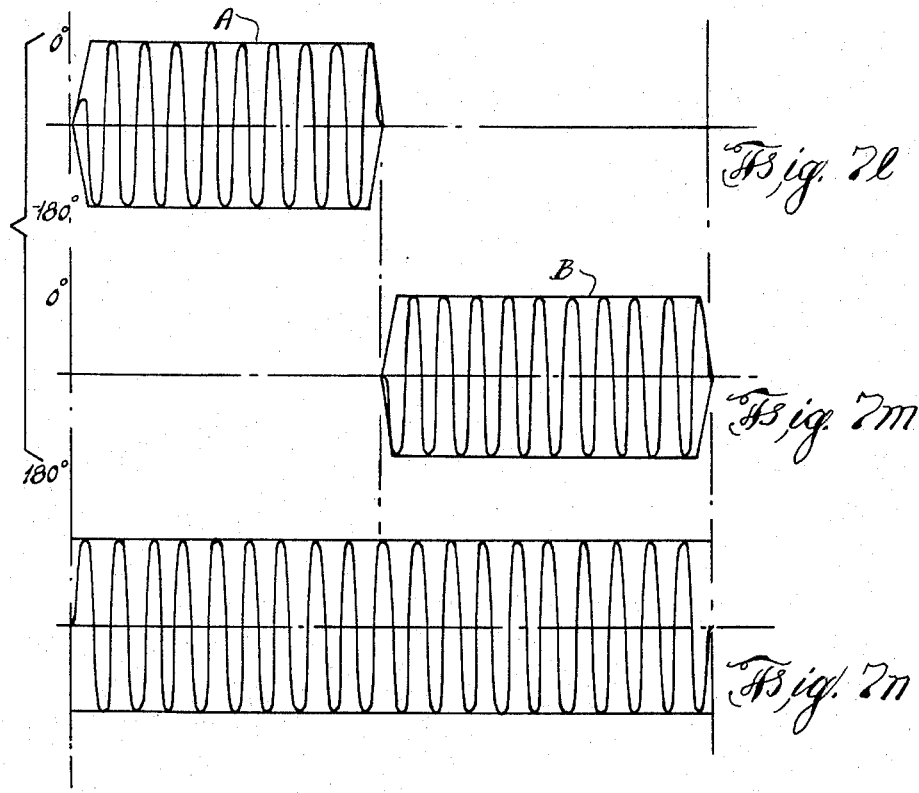
Fig. 7l
Fig. 7m
Fig. 7n
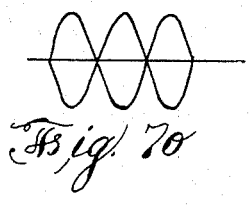
Fig. 7o
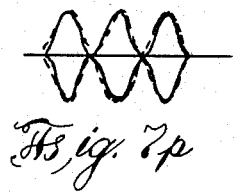
Fig. 7p
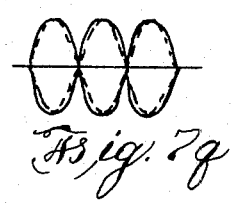
Fig. 7q
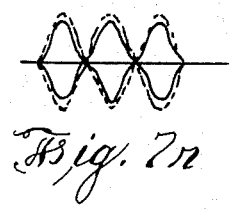
Fig. 7r
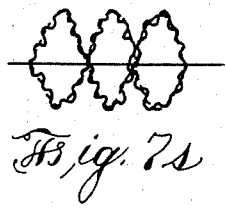
Fig. 7s
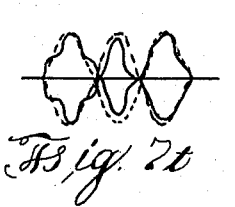
Fig. 7t
INVENTOR.
ANTHONY C. PALATINUS
BY *Ernest J. Weinberger*
*John M. Pearson*
ATTORNEYS

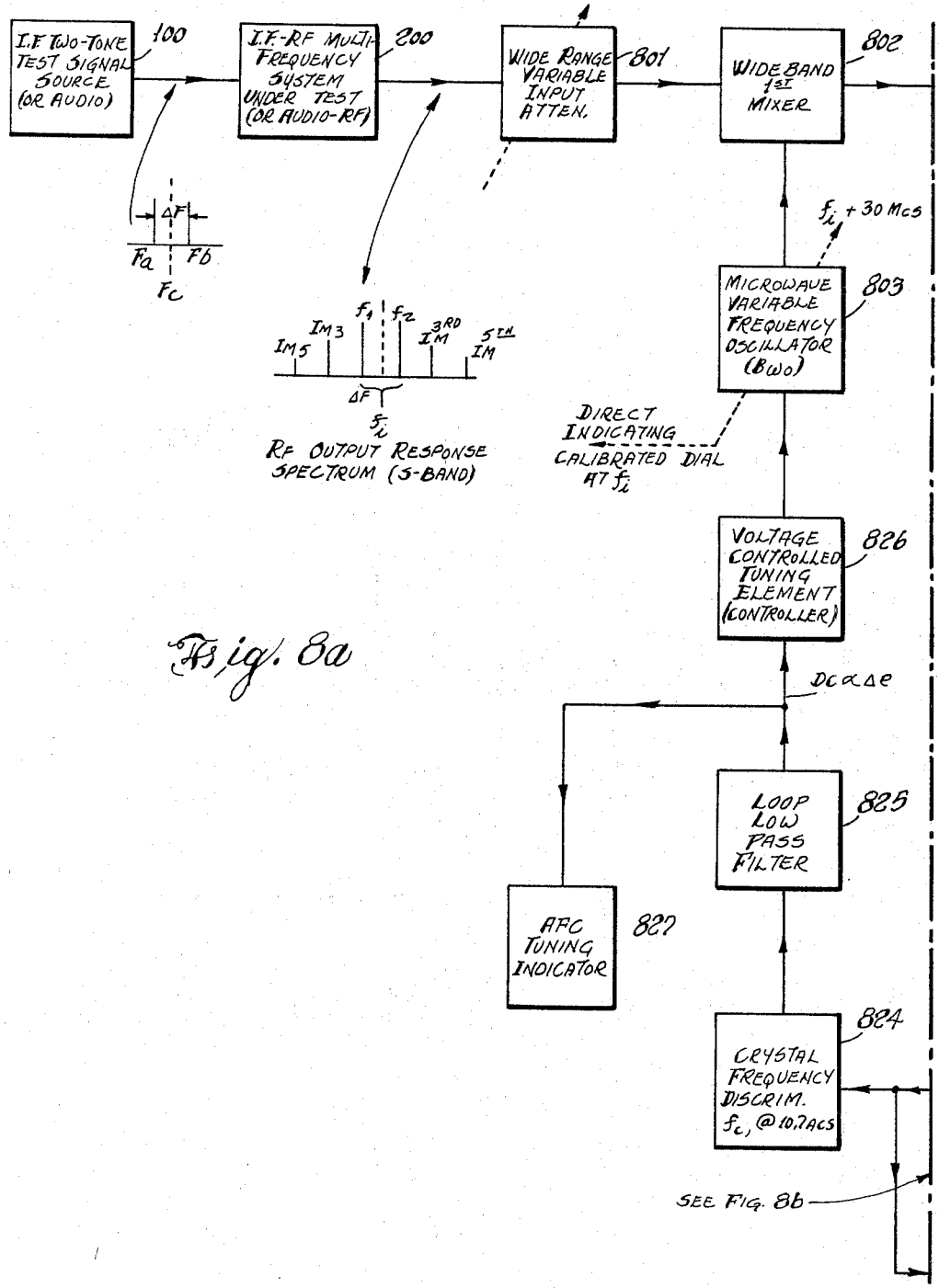

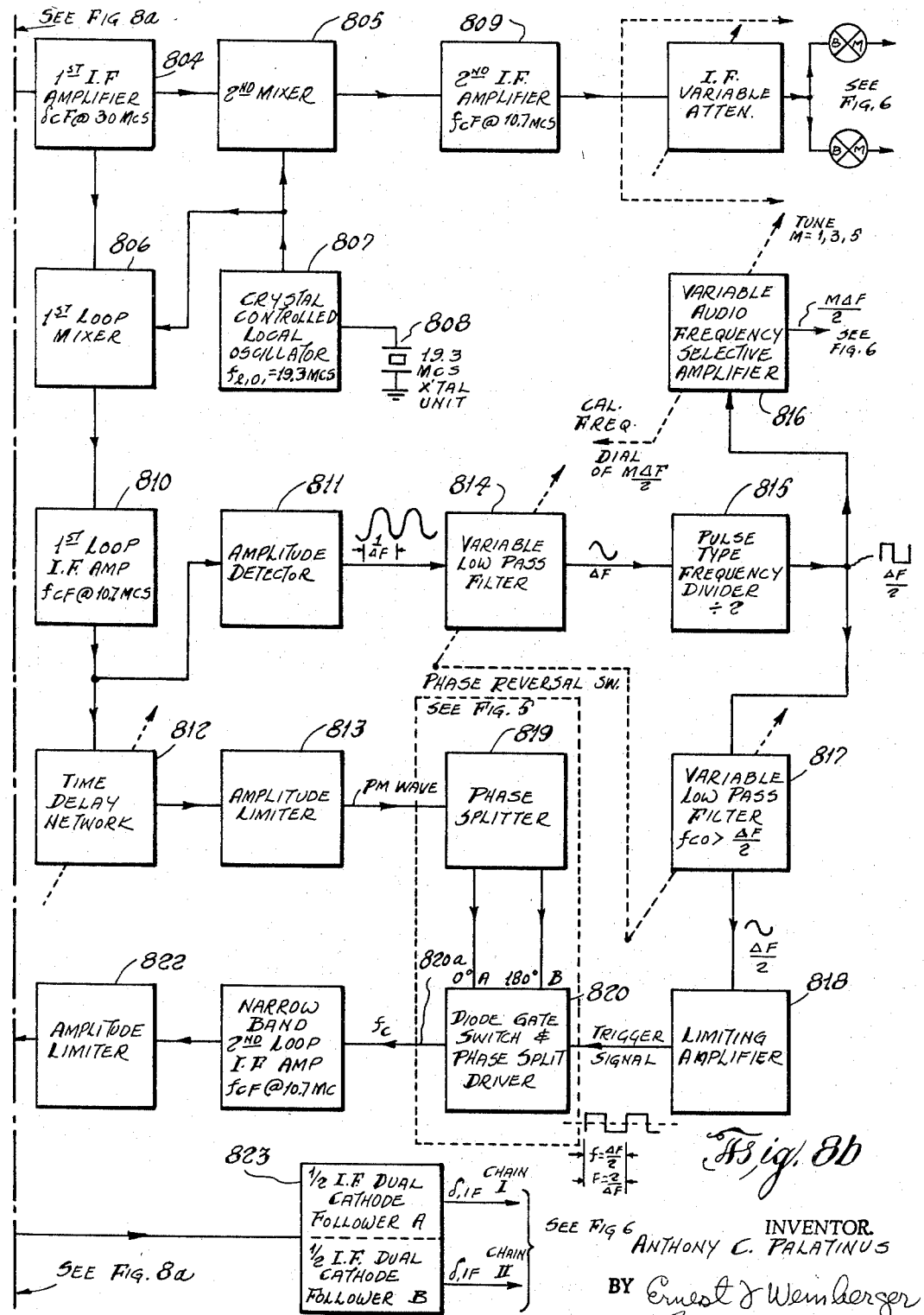

3,411,080
INTERMODULATION DISTORTION
WAVE ANALYZER
Anthony C. Palatinus, 68—17 60th Road,
Maspeth, N.Y. 11378
Filed June 29, 1965, Ser. No. 468,180
3 Claims. (Cl. 324—57)

ABSTRACT OF THE DISCLOSURE

A multi-frequency system intermodulation (IM) wave analysis of the spectrum response output. A frequency controlled two-tone equal amplitude test signal is applied to a system which possesses an internal heterodyne operation. The system intermodulation distortion test and wave analysis technique is implemented by a single audio frequency reference integrated test set arrangement comprising a frequency difference stabilized two tone signal source which has its frequency reference functioning in the frequency stabilization and audio tuning of a wide frequency range and an audio frequency tuned selective filter output analyzer. This distortion measurement operation sequentially indicates the relative amplitude relationship of the 3rd and 5th odd order distortion products to one tone of the applied two tone signal.

---

The invention described herein may be manufactured and used by or for the Government of the United States of America for governmental purposes without the payment of any royalties thereon or therefor.

The present invention relates to methods of, and apparatus for, the test and measurement of linearity characteristics of electrical devices and systems in general, and further, directly concerns techniques and circuitry for frequency tuning and automatic stabilization over the wide frequency range operation of such systems test apparatus in particular.

More specifically, this invention embodies nonfrequency scanning principles of RF waveform analysis leading to the intermodulation distortion characteristic measurements of active quasi-linear electrical devices such as linear RF amplifiers, passive units such as crystal filters, and multiple frequency systems, such as the frequency translation stages of transmission systems, in response to the well known two tone test signal.

In addition, it is a special interest of the present invention to be fully involved with automatic control techniques for the precise and stable frequency translation and positioning of such RF spectrums resulting from a two tone test signal response to about a predetermined reference carrier frequency value of the test system.

The present invention is related to my copending application Intermodulation Test System whose Frequency is Governed by an R. F. Two Tone Signal, Ser. No. 358,383 filed Apr. 8, 1964. It is related thereto by way of the active audio tuned selective filter signal processing which, likewise in this present invention, serves to accomplish the novel intermodulation distortion measurement by wave analysis technique with filtering and tuning done at low audio range.

The present invention introduces significant innovation differing from my copending application in that the basic method is further extended to allow wide frequency range operation for linearity evaluation of multiple frequency systems under test, and wherein a unique method of frequency stabilization of the frequency translation operation of the test apparatus is herein established and single audio frequency oscillation control of the overall test method is accordingly accomplished.

It is notable that the static two tone RF wave analysis method of intermodulation distortion measurement, as initially exemplified in my co-pending application mentioned above in the test of electrical devices, and to be further demonstrated herein in the test of electrical systems, is not to be frequency limited, but to be consonant with the high degree of stability and exacting preciseness necessarily required of such a controlled frequency selective method, and to yet provide wide input frequency range coverage, present conventional techniques of automatic frequency control and/or automatic phase control, as practiced in the art to secure such operation, by themselves, do not suffice within the measurement technique of this invention. My copending application incorporates a novel embodiment of self-tracking frequency tuning that readily produces the desired frequency translation without use of automatic control techniques, and by itself is suitable for the given spectrum band of say 2–30 CMS. in the test of such range amplifiers and filters, to which it is so referenced by way of given examples.

However, in wide frequency range operation of say 10–1000 MCS., it is then desirous to ring about a multiple heterodyning signal processing to gain advantages of greater sensitivity, higher image rejection, improved signal to noise ratio, etc. A lessening of the test system stability would result from use of additional crystal controlled conversion stages and further securing of the mean frequency signal of two tone generation at various spectrum regions becomes increasingly more difficult to achieve, particularly so where multi-frequency systems test is required. Various methods of automatic frequency stabilization are known to the art, such as conventional automatic frequency control (AFC) and/or automatic phase control (APC) techniques. In the present art, where AFC or APC is used in frequency translation stabilization, in general either the local oscillation signal frequency or one of the translated signal frequencies is compared to a reference frequency value or the phase of a reference frequency signal. In a wide range tunable operation, control of the tuned local oscillator frequency itself with respect to a reference usually requires frequency synthesis. For example, in say the 2–32 MCS. region, the local oscillator signal source may be stable variable frequency oscillators such as crystal frequency synthesizers, but most often the extreme complexity and great expense of frequency synthesizers excludes them.

As such, it is usual practice to select one of the translated signal frequencies at some location in their signal path for the comparison purpose. In cases where only a singular frequency component such as a CW signal is being translated, stabilization is readily made. In those cases where the frequency component structure under translation consists of sidebands closely spaced, selection of the desired frequency terms for comparison and control becomes increasingly more complex.

When the spectrum being translated is of conventional modulation nature, such as pulse or sinusoidal AM waves, then selection and comparison, while difficult, may be made of the translated carrier component or related sideband term. It is in the area where the translated sideband component structure does not possess a singular frequency term which is to locate itself at any pre-determinable frequency value useable for a reference comparison that prior art stabilization techniques are deficient. Where the spectrum under translation is of a complex sideband nature like that of the well known two tone type signal, possessing a small amount of frequency difference, and wherein it is further intended to thereby attain wave analysis of this spectrum content by selective filtering and tuning in the low audio region, the need of dual stabilization and control capability becomes functionally apparent and is deemed an operational requirement.

Accordingly, it is essential that the two tone type spectrum be precisely and repeatedly positioned with respect to a reference frequency that is likewise an operating signal of the activated selective filter process; and the audio frequency difference of the two tone signal be set and maintained with respect to a audio reference frequency that is related as an operating signal of the output measuring means by which the exact audio frequency tuning and highly selective audio frequency filtering is properly accomplished. Since overall stabilization of the present test system invention is desirable, the conventional AFC or APC connotation, and the limited operational procedure so represented, fails to suitably define the complete novel signal processing action and unique automatic circuit functioning of the new stabilization technique implemented as illustrated and described herein. Whereas one notes specifically that the specialized characteristic of the featured control method being disclosed concerns the automatic positioning of the mean frequency value of the two tone type RF spectrum response output under investigation to be precisely located at, and thereafter locked thereto, the reference IF carrier frequency value of the overall test system; and in view of the relationship further noted between the nature of the translated test spectrum and the subsequent manner in which its wave analysis is made, the full operational procedure delineated by way of this specification is more appropriately designated automatic carrier positioning. Hence hereinafter it will be designated by the abbreviated connotation "ACP." Therefore, as will be clearly pointed out by the explanations that follow with reference to the accompanying typical illustrated practical embodiments, one may generally define define automatic carrier positioning (ACP) as a technique for the precise and stable control of two tone type spectrum signal translation to a newly desired mid-frequency value in an automatic manner of closed loop operation with respect to a carrier frequency reference valve.

In general, the stated objectives of my copending application that pertain to the overall test method and test system are equally applicable for the present invention, but is now further extended to include multiple frequency electrical systems testing. Therefore, one overall objective is to provide a measurement technique that effectively integrates the two tone signal characteristics with the RF response output measuring characteristics and thereby provide apparatus and method for economically and rapidly determining with repeatable ease, stability, accuracy, sensitivity and without the conventional frequency separation limitations, the intermodulation distortion characteristics of multiple-frequency systems or of a particular device at various frequency locations.

Another object of this invention it so provide a method and means for the stabilized frequency translation of an RF two tone type spectrum with precision and positional control in an automatic manner. It is also an object of this invention to provide a method and apparatus for wide frequency coverage, multiheterodyne operation of the two tone RF wave analysis technique of intermodulation distortion test and measurement.

An additional obejct of this invention is to provide a method and apparatus for the generation and switchable selection of the audio frequency tuning signals of the distortion measuring apparatus in a nonharmonic, unmultiplied manner.

An auxiliary object of this invention is to provide a method and apparatus for self-operative tuning instrumentation separate of the test signal source that accordingly by itself functions as a highly selective RF Wave Analyzer for the general wave analysis of RF two tone type spectrum content.

Other objectives and advantages will appear clear from the following description and the novel features thereof will be particularly pointed out in the appended claims.

In the accompanying drawings:

FIG. 4 is a detailed block diagram of a practical embodiment of the audio frequency operating signal generating circuit arrangement of the test system in accordance with the invention;

Figure 6B:
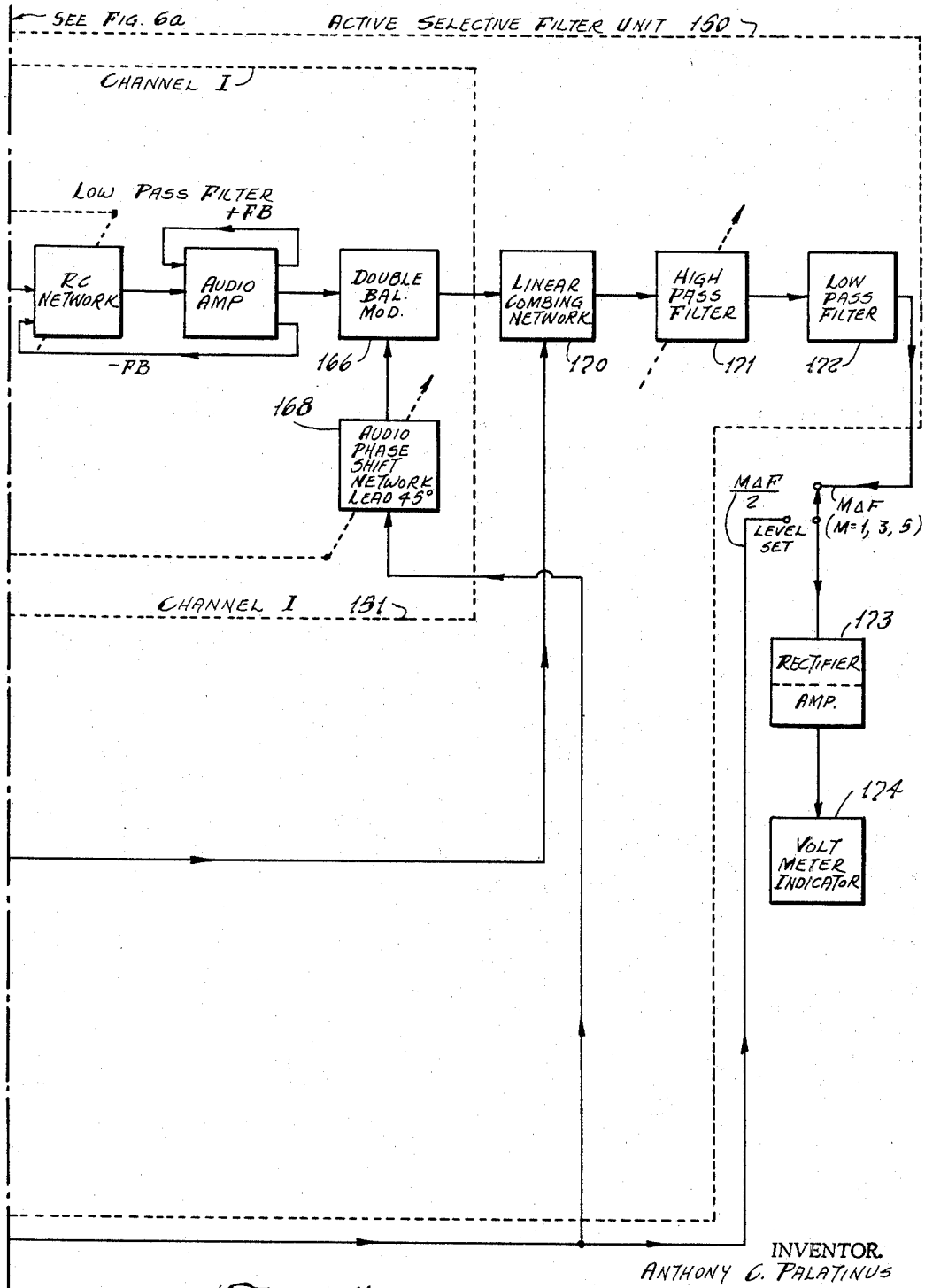

FIGS. 6a and 6b a detailed block diagram of an audio tunable selective output measuring circuit arrangement made in accordance with this invention;

FIGS. 7a through 7t are a representation of a series of typical waveforms that appear within the signal processing action of the embodiment of this invention; and FIGS. 8a and 8b are a detailed block diagram of a wide frequency range, super-hereterodyne, self-operative circuit arrangement of the test system for the distortion test and measurement of an audio to RF transmission system made in accordance with the principles of this invention.

ANALYSIS OF OVERALL OPERATION

Figure 1A:
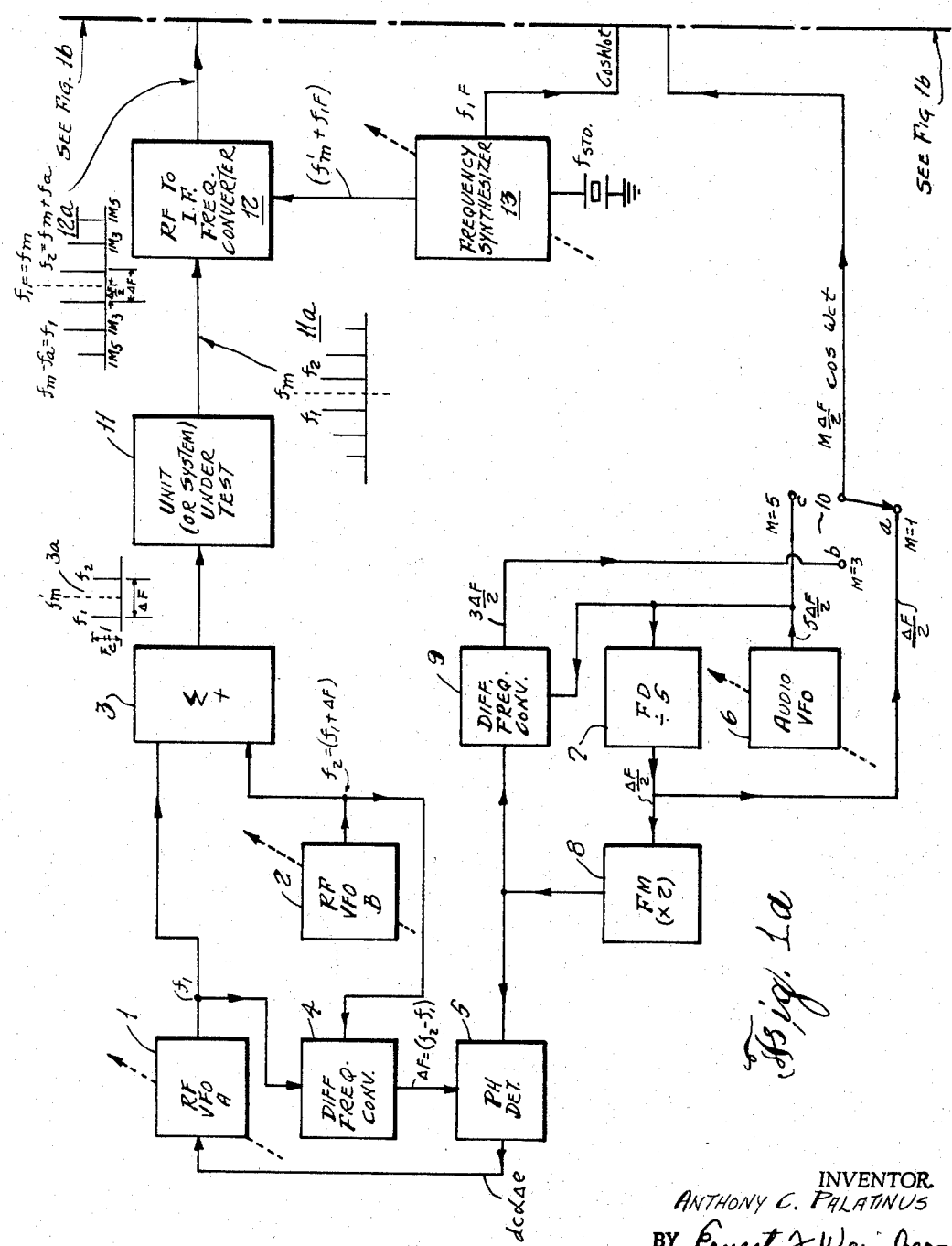
FIGS. 1a and 1b are an overall symbolic block representation of the basic signal processing of the test method and measurement system made in accordance with the principles of the invention.
Figure 1B:
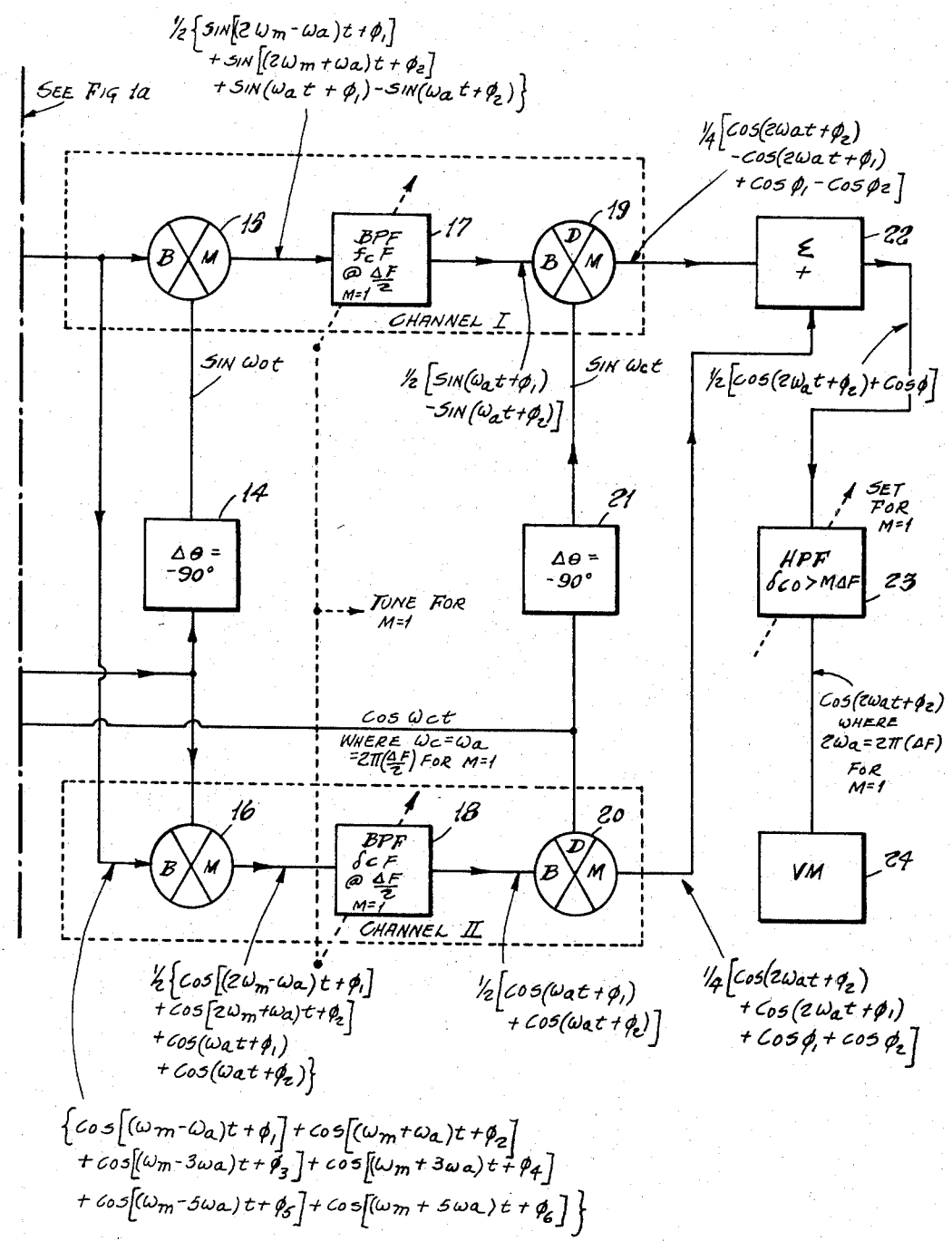

In FIG. 1 the single tone controlled two tone generator source consists of RF variable frequency oscillator 1, supply tone frequency $f_1$; RF variable frequency oscillator (VFO) 2 producing tone frequency $f_2$, where $$f_2 = (f_1 + \Delta F)$$

and is of equal amplitude as tone frequency $f_1$; and linear summing stage 3 which combines the two separate tone frequencies for the well known two tone test signal at its output as shown in spectrum sketch at 3a. Single tone control is achieved by also simultaneously applying tone frequency $f_1$ to one input of differential frequency converter (DFC) 4 and the tone $f_2$ to the other input of DFC 4, where a differential frequency converter may constitute a mixer and low pass filter combination. The resulting difference frequency product of $\Delta F = (f_2 - f_1)$ is filtered at the output of DFC 4 and applied as one input to phase detector (PD) 5. The reference input to PD 5 is obtained as $\Delta F$ reference from the audio frequency signal generating section. The resulting DC correction voltage output of the phase detector 5 coacts with the voltage controllable frequency determining element of one of the tone oscillators, say RF VFO 1, to bring about the phase lock between the signal $\Delta F$ being applied to the phase detector and the reference $\Delta F$ signal.

The audio frequency signal generating section supplies the audio signals and the frequency difference reference signal $\Delta F$, with such signals being derived from a single audio reference oscillator, audio VFO 6. Audio VFO 6 is tuned to generate a frequency output of five times one half the frequency difference between the two RF tones generated or $5\Delta F/2$ c.p.s. The audio signal output of $5\Delta F/2$ is applied over three separate paths. One path feeds the input of frequency divider 7 to thereupon produce at the FO 7 output audio frequency signal of $\Delta F/2$ c.p.s. A second path of signal $5\Delta F/2$ leads to one input of differential frequency converter DFC 9 and the remaining path connects to contact C of "M" term selector switch 10.

The audio signal of $\Delta F/2$ is fed to frequency (doubler) multiplier 8 and is also connected to contact A of "M" selector switch 10. Frequency doubler, FM 8, produces the audio signal output of $\Delta F$ c.p.s., which thereupon is applied to the phase detector PD 5 of the single tone controlled two tone generator to serve as the audio reference signal input in the phase comparison operation. The ΔF signal is also fed to the other input of DFC 9, which may consist of a double balanced modulator and low pass filter combination. The resultant output of DFC 9 is the difference frequency product term of (5ΔF/2−ΔF) or a 3ΔF/2 c.p.s. signal, which is then connected to the B contact of "M" term selector switch 10.

Unit under test 11 responds to the two tone test signal input to produce at its output the RF two tone signal plus intermodulation distortion components resulting from unit under test's 11 non-linearities as shown by way of spectrum sketch at 11a. The RF spectrum response which is centered say about mean frequency location $f_m$ where $f_m = (f_1 + \Delta F/2)$, is applied to input of RF to IF converter 12. RF to IF converter 12, which may consist of a mixer-IF amplifier combination, receives its local oscillator signal from frequency synthesizer 13 presently used only here as the local oscillator source. Frequency synthesizers are well known in the art, as well as their cost and complexity. For the moment, consider frequency synthesizer 13 tuned to generate the local oscillator signal frequency of $(f_m + f_{IF})$, wherein $f_{IF}$ is a predetermined fixed IF frequency value separately derived and generated from the same crystal frequency standard, $f_{st}$, of the synthesizer in the conventional manner. RF to IF converter 12 is fixed tuned to the difference frequency product terms at its output, wherein the new mean frequency location of the converted spectrum, now becomes $(f_m + f_{IF} - f_m)$ or $f_{IF}$.

The frequency converted two tone test signal response to be analyzed as shown sketched consists of lower and upper main tone frequency components of $f_{1''}$ and $f_{2''}$ respectively, where $f_{2''} = f_{1''} + \Delta F$; lower and upper third odd order difference frequency (IM3) intermodulation distortion signal components of $2f_{1''} - f_{2''} = f_{1''} - \Delta F$ and $2f_{2''} - f_{1''} = f_{2''} + \Delta F$ respectively; and lower and upper fifth odd order difference frequency IM products of $3f_{1''} - 2f_{2''} = f_{1''} - 2\Delta F$ and $3f_{2''} - 2f_{1''} = f_{2''} + 2\Delta F$ respectively.

Now for purpose of convenience in the analytical explanation of the selective filter process that follows, consider only the main two tone components of the test spectrum input being applied, i.e. assume for the moment the unit or device under test 11 to be linear and without distortion. Here note is to be made of the fact that a double sideband wave, which is a suppressed carrier AM signal has its sidebands coherent, that is, of equal but opposite phase, while the two tone signal is non-coherent, i.e. the phase relation of each tone is independent of the other tone's phase.

Accordingly, the two tone signal of main tones $f_{1''}$ and $f_{2''}$ of unity tone amplitude and their odd order intermodulation components, say the 3rd and the 5th, can by frequency representation be expressed as a double side-band suppressed carrier signal, with the sideband terms being of differing phase relations.

Hence, the spectrum response is then expressed as $$\left\{ \cos\left[(W_m - W_a)t + \phi_1\right] + \cos\left[(W_m + W_a)t + \phi_2\right] + \frac{1}{K_3}\cos\left[(W_m - 3W_a)t + \phi_3\right] + \frac{1}{K_4}\cos\left[(W_m + 3W_a)t + \phi_4\right] + \frac{1}{K_5}\cos\left[(W_m - 5W_a)t + \phi_5\right] + \frac{1}{K_6}\cos\left[(W_m + 5W_a)t + \phi_6\right] \right\}$$

For the main tones consider $[\cos(W_m - W_a)t + \phi_1]$ and $[\cos(W_m + W_a)t + \phi_2]$ the first term being tone A $(f_{1''}) = (f_m - f_a)$ with the frequency $(f_m + f_a)$ being the second tone B $(f_{2''})$. Here $W_m = 2\pi f_m$, where $f_m$ is the mean frequency value of the translated two tone signal or $(f_{1''} + f_{2''})$ or equal to $f_{IF}$; and wherein $W_a = 2\pi f_a$ with $f_a$ being equal to one half the audio frequency separation between the tones or $(\Delta F)/2$ where $$\Delta F = f_2 - f_1$$

Finally, $\phi_1$ and $\phi_2$ are the respective phase angles of tones $f_{1''}$ and $f_{2''}$ and independent of each other.

Referring now to the translated test response spectrum sketch 12a shown at the output of frequency converter 12 as translated to the mean frequency value of $f_{IF}$, wherein $f_{IF} = f_o$, then let the synthesizer 13 IF signal output be the common carrier signal of unity amplitude $\cos W_{ot}$ being supplied for the first pair of balanced modulators 15 and 16 of Channels I and II respectively. Whereupon the applied carrier signal passes through 90° phase (lag) shift network 14 prior to being applied to balanced modulator 15, and then be expressed as $(\cos W_{ot} - 90°)$ or $\sin W_{ot}$. The carrier IF signal inputs to modulators 15 and 16 are in quadrature i.e., 90° out of phase with respect to each other.

The resultant product term output of modulator 15, for $W_m = W_o$:

$$\tfrac{1}{2}\{\sin[(2W_m - W_a)t + \phi_1] + \sin[(2W_m + W_a)t + \phi_2] + \sin(W_{at} + \phi_1) - \sin(W_{at} + \phi_2)\}$$

The components of $(2W_m - W_a)$ and $(2W_m + W_a)$ represent the translation of the two tone signal to about twice its mean frequency value and are the upper sideband terms, and the terms of $W_a$ only represent the folded over difference frequency components with respect to zero frequency and are the lower sideband terms. Going now to the modulation process for the balanced modulator 16 of Channel II, we have the double sideband output of the product expressed as the following for $W_m = W_o$:

$$\tfrac{1}{2}\{\cos[(2W_m - W_a)t + \phi_1] + \cos[(2W_m + W_a)t + \phi_2] + \cos(W_{at} + \phi_1) + \cos(W_{at} + \phi_2)\}$$

The first two terms constitute the upper sideband and the remaining two terms being the lower sidebands. The Sine function components of Channel I and the Cos terms in Channel II represent the quadrature relationship that exists between the modulator outputs of these two channels. The audio bandpass filters 17 and 18, that follow modulators 15 and 16 respectively may be a combination of high pass filters in series cascade with low pass filters, wherein the center frequency value of the bandpass region, for $M=1$, 3 or 5 is interval tunable in ganged manner to $f_{c.f.} = M\Delta F/2$.

Accordingly for the main tone measurement, then set for $M=1$ and $f_{cf} = \Delta F/2 = f_a$, results in only the audio terms of $W_a$ being passed and all other components being eliminated. It is to be noted that the selected audio terms consist of folded over signals as a consequence of having the carrier oscillator source $f_o$ identical in frequency value to the mean frequency value of the two tones or $f_m$.

The passed audio terms are then the following:

Channel I: $\tfrac{1}{2}[\sin(W_{at} + \phi_1) - \sin(W_{at} + \phi_2)]$
Channel II: $\tfrac{1}{2}[\cos(W_{at} + \phi_1) + \cos(W_{at} + \phi_2)]$ Thereupon, the double balanced modulators 19 and 20 of each channel have a modulating signal applied that contains the folded over audio terms of $f_a$ remaining after the selective filter action.

The common audio carrier signal for the double balanced modulators obtained from the wiper of M term selector switch 10 has been set to be of a frequency value identical to the modulating signal frequency, i.e. with M wiper at $M=1$ position supplying operating signal $\Delta F/2$.

Let the oscillator source of $\Delta F/2$ be expressed as $\cos W_{ct}$, where again the carrier signal undergoes a 90° phase shift through phase shift network 21 in its path to Channel I, but is directly applied to double balanced modulator 20 of Channel II. The product output of modulator 19 becomes for $W_c = W_a$ at $M=1$, $$\tfrac{1}{4}[\cos(2W_{at} + \phi_2) - \cos(2W_{at} + \phi_1) + \cos\phi_1 - \cos\phi_2]$$

For Channel II, the product output is:

$$\tfrac{1}{4}[\cos(2W_{at} + \phi_2) + \cos(2W_{at} + \phi_1) + \cos\phi_1 + \cos\phi_2]$$

Accordingly, the linear additive summation of the two signals at the summer stage 22 results in the output signal of $$\tfrac{1}{2}[\cos(2W_{at}+\phi_2)+\cos\phi_1]$$

Upon application of this signal to high pass filter 23, the DC component term of $\cos\phi_1$ is removed, where for $M=1$; and with filter 23 cut off frequency slightly less than $\Delta F$ c.p.s., its output becomes $\cos(2W_{at}+\phi_2)$ where $2W_a=2\pi(2f_a)=2\pi\Delta F$.

Voltmeter 24 measures the amplitude of this signal component, which represents the amplitude of the main upper tone frequency of $(f_m+f_a)$ or $f_{2''}$.

In a like manner as described above, the selective filtering process for $M=3$, and 5, provides for the amplitude measurement of the upper third and fifth intermodulation distortion component of the test signal spectrum under analysis.

In a similar signal process for the intermodulation component terms appearing below the mean frequency value, use of a subtractive combining network for the summer stage 22 allows for the amplitude measurement of the selected lower main and intermodulation terms below the mean frequency value.

As pointed out hereinbefore, the frequency synthesizer 13 has been shown used for the moment in FIG. 1 for purposes of conveniently explaining the overall signal processing operation of the essential elements of the overall method and apparatus. Now, in further accordance with the principles of the present invention and the stated objectives of less complex and more economical test apparatus, the synthesizer 13 is herein directly replaced by a unique frequency stabilization technique as shown illustrated by the remaining figures of this specification and fully detailed and described in the paragraphs that herein follow.

It is to be noted that difficulty would be experienced in practice by the use of a complex frequency synthesizer, due to the fact that while the synthesizer may be set to the exact local oscillator frequency value desired, and thereafter so remain, the stability of the test signal being used itself may well result in a changing of the resultant translation to about a new mean frequency value other than the predetermined I.F. As such, the further advantages of the ACP technique incorporated with the present invention in providing a controlled local oscillator signal frequency that secures and maintains the translation to about the predetermined frequency in a novel manner that is not totally dependent on the stability of the test signal source are evident.

It is to be understood that a unique frequency stabilization technique is disclosed herein to thereby economically achieve the novel overall test method and therefore produce useful implementation of the inventive apparatus illustrated and described herein, this new ACP method of frequency stabilization by itself is generally applicable wherever two tone type signals are to undergo frequency translation as for example in frequency scanning spectrum analyzers.

A further observation is the universal and basic purpose afforded by the new technique of stabilization where self-operative accomplishment of the process is contemplated and employed as additionally shown disclosed and described by way of this specification in a multiple heterodyne operation of wide frequency coverage given in FIG. 8.

OVERALL TEST SYSTEM

Figure 2A:
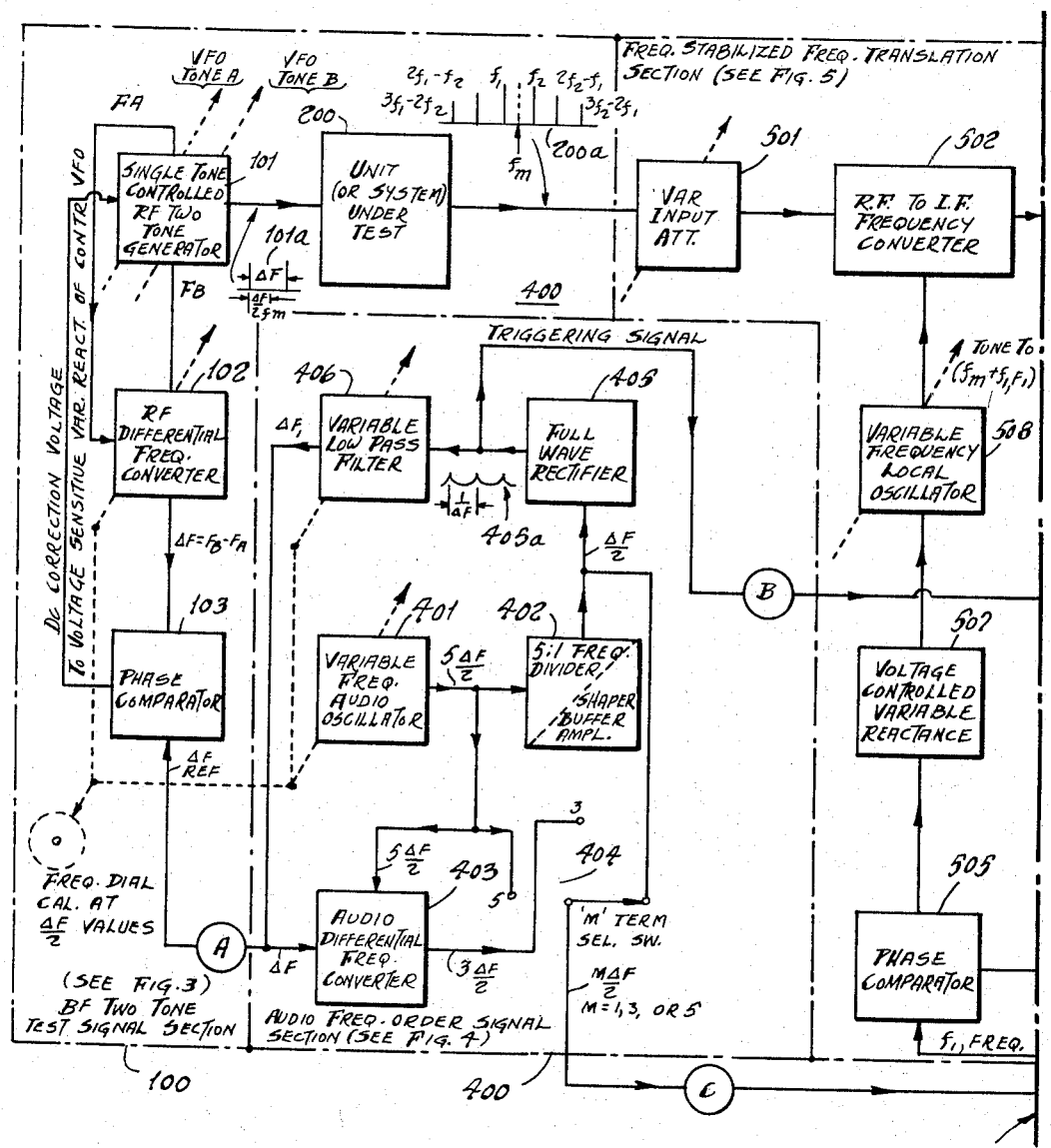
FIGS. 2a and 2b are an overall block diagram representation of an elementary embodiment of the test system constructed in accordance with the principles of this invention.
Figure 2B:
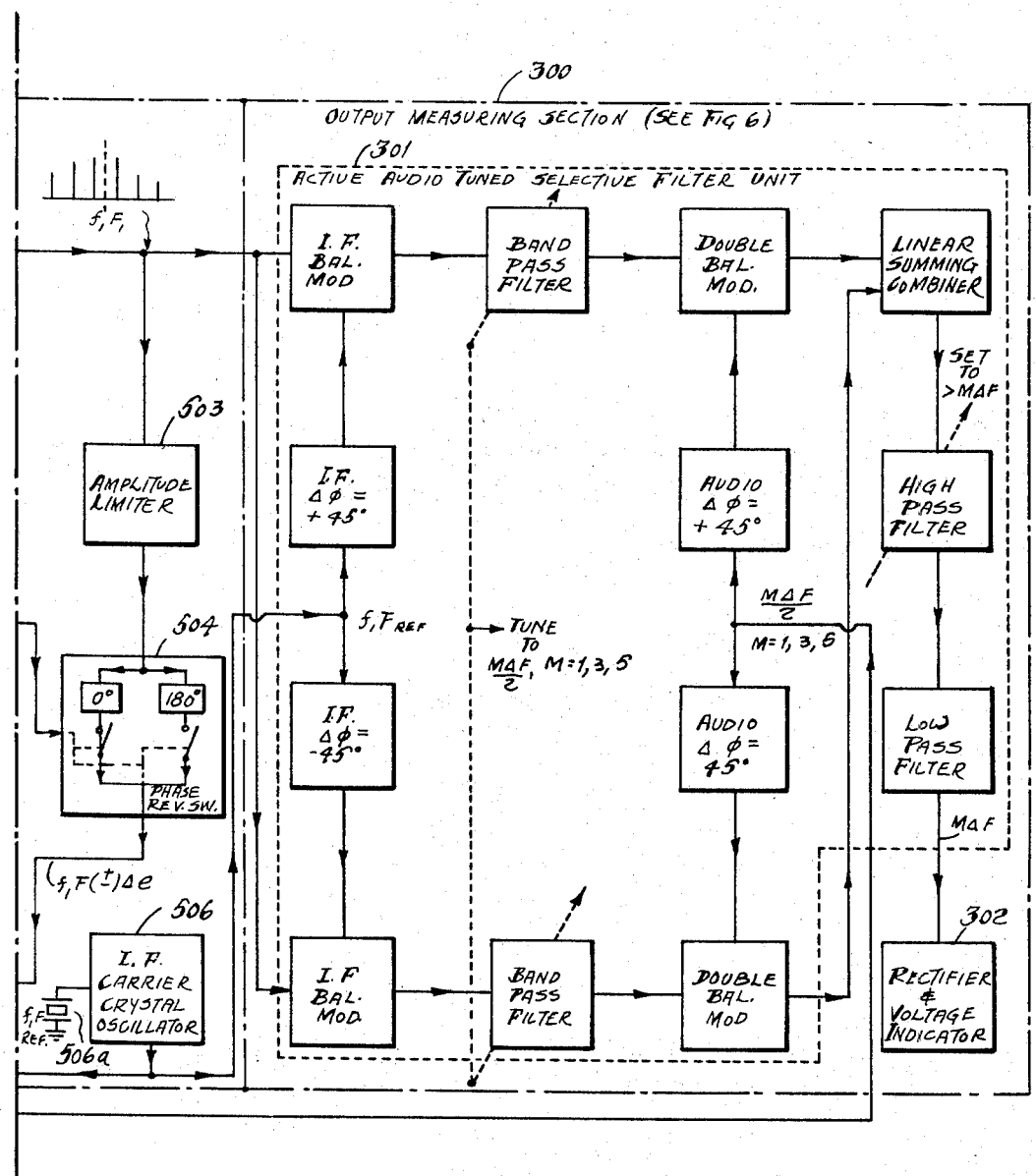

Referring now to FIG. 2 which is an overall block diagram arrangement of the invention test system in an elementary form. The entire RF intermodulation test set illustrated essentially consists of signal generating and output measuring apparatus. The basic details of the technique employed in this method of RF two tone intermodulation distortion wave analysis, with accompanying mathematical analysis of the signal processing and an analogous description and illustration of the test operation was given in the prior paragraphs of this specification. As such only a brief description is presented of the principles involved for the overall procedure, while the additional principles that govern the necessary features of the method as it pertains to the present embodiment and its novel audio control and RF stabilization sections that allow for multiple-frequency systems testing are discussed in detail.

For a complete understanding and basic description of the overall functional operation of the illustrated basic embodiment of FIG. 2 from which the general objectives and advantageous features previously stated will become further evident, along with other objectives and novel features to be pointed out; the properties related to the signal processing action is further examined.

The following is an explanation of the principles and techniques uniquely implemented herein for frequency stabilization and control purposes.

The complex two tone waveform, in being a hybrid wave, is known to consist of amplitude modulation components and phase modulation components, and such differing type modulation components are separable from each other. Various detection devices may be used to extract the amplitude modulation components from the complex waveform while usage is usually made of limiting means to secure a constant amplitude waveform whereby the amplitude modulation components are removed thus leaving only a phase modulated waveform. The amplitude modulated components of the two tone signal are obtained from the envelope of the RF waveform. This RF envelope, generated by the linear addition of two equal RF sinewaves which are separated in frequency by very small percentage, is the resultant voltage waveform of half sinewave symmetrical about a zero axis, and of time variable undulation from zero to maximum to zero with the repetitive frequency being dependent upon the frequency difference of the two combined waves. Herein this invention makes use, in a manner not readily obvious to one experienced in the art, of the fact, further known but not often applied, that the amplitude detected RF envelope of such a two tone signal, which represents its amplitude modulation components, is essentially a resultant waveform that is substantially equivalent to the resultant wave shape generated by the full wave resistance loaded rectification of a sinusoidal wave that is frequency-wise equal to one-half of the difference frequency value between the absolute frequency values of the two combined tones, that is $\Delta F/2$ c.p.s.

Consider now the phase modulated components which remain when the amplitude modulation components are deleted from the two tone waveform.

As is commonly done in conventional frequency modulation art, the amplitude variation of the two tone waveform may be eliminated by amplitude limiting devices. Where substantially exact amplitude limiter action is introduced, the resultant constant amplitude waveform of a phase modulated wave is known to exist.

From the understanding of long known prior art, in respect to phase and frequency modulation, the nature of the resultant component spectrum distribution obtained for the limited two tone signal may be further identified.

One notes more readily the characteristics of the modulating signal for such sideband distribution as exhibited by the phase modulated wave when it is also observed from the two tone waveform that with angular velocities of $W_1=2\pi f_1$ and $W_2=\pi f_2$, subsequent phase coincidence periodically occurs at a rate equal to the reciprocal of the detected envelope repetition frequency of $\Delta F$, that is, at a period of $1/\Delta F$. These essentially zero crossover points indicate a phase transversal from in phase, or zero degrees at positive peaks; to out of phase or 180 degree shift at negative peaks, through a period of $$1/\Delta F + 1/\Delta F = 2/\Delta F$$

or at $\Delta F/2$ repetition frequency.

In general, the modulation index may be considerably small and as such only the first order PM sideband and adjacent side-frequency pair are usually significant. In a like manner, the third-odd order distortion product frequencies by themselves usually may be assumed, and in essence, considered a two tone equal amplitude pair of triple frequency spacing or $3\Delta F$, and resulting first order PM sideband from limiting of such a wave therein coincide in frequency location with the sideband distribution obtained from limiting of the main tone pair. Again, but to a lesser extent with regards to the resultant phase modulated wave, a similar observation may be made for the 5th odd order pair. By way of such analogy it is indicative that in the majority of cases, the phase modulated wave resultant from the limiting of a two tone wave possessing small amount of distortion does not differ significantly, with only the AM component wave being affected by the distortion content.

As to be expected in the limiting of a two tone wave, new frequency components are developed and spaced $\Delta F$ intervals apart much in the manner of IM distortion distribution. For the phase modulated waveform, it is noted that all sideband components result either exactly in phase or 180 degrees out of phase, that is, one of each of its sideband components is in phase with the corresponding IM distortion product, with the other component of the pair being of reverse polarity in sideband distribution structure, and hence in like phase modulation characteristic from that of a limited pure two tone wave.

Accordingly, having the phase modulated waveform, by way of limiting action, it is now desirable to bring about a manner of phase demodulation. However, in this case, the nature of the demodulation action is to concern the extraction of the carrier signal of the phase modulated waveform and not the modulating signal itself which is expressed in the distributed sidebands. Here one departs from the conventional well known practice of using a coherent carrier signal as a demodulating switching signal to bring about the extraction of the modulating signals from a modulated waveform. In the present case of carrier signal extraction, one makes use of a functionally reverse process, that is, a phase reversal switching action is used to effect phase demodulation wherein the equivalent modulating signal is generated and applied as the switching signal. As is known to the art, the phase characteristic with respect to time of the phase modulated waveform resulting from limiting of a two tone equal amplitude signal, when referenced to the mid- or mean frequency value of the two tone frequencies, undergoes 180 degrees phase reversal, say between 0 degrees and 180 degrees, for every full cycle of the difference frequency $\Delta F$. Now from this characteristic, the phase modulation function may be recognized as a symmetrical square wave of $(\Delta F/2)$ pulse frequency, and hence such a like switching signal may be generated to control the phase modulated waveform by way of a phase reversing switch whose alternation between paths of opposite phase results from the polarity changes of the applied switching signal.

As will be observed from the circuits functional description later on, the resulting phase reversal action operates on the phase modulated waveform; wherein for one polarity direction of the square wave, the carrier of the PM wave is one phase value while at the other polarity position of the square wave, the phase polarity of the PM wave's carrier likewise reverses. This, with the elimination of this latter phase reversal of the carrier by inserting suitable phase reversing means within one of the PM wave signal paths, the carrier signal of the PM wave remains constantly of the same phase value, and with the phase modulation removed, the resultant output signal is then a continuous single frequency signal of carrier frequency value.

In other words, the limited two tone signal, having a peak to peak phase shift of 0 to 180°, or one-half cycle, may represent in an analogous manner the phase inversion characteristic of single audio tone doubled sideband suppressed carrier modulation between half cycles of the modulating wave. Here the suppressed carrier frequency value represents the mean frequency value between the two tones; the single tone modulation may then be equal to $\Delta F/2$, and the frequency separation $\Delta F$ between the tones becomes the alternating period between the phase shifts of equal but opposite amount. Now, it becomes evident, the phase modulation components of an amplitude limited to two tone RF equal amplitude signal are readily equivalent to the resultant spectrum that is derived from the phase modulation of a carrier signal, of frequency value equal to the mean frequency value of the two tone signal that is being limited, by a modulating signal of square waveform shape which is of pulse repetition rate or frequency equal to one half the difference frequency between the two tone frequencies, that is of $(\Delta F/2)$ value.

Having obtained in the described manner, the signal frequency of value equal to the mean frequency value of the two tone type RF response subsequent stabilization and control action is now applied through use of conventional combination frequency and phase comparison with respect to the exact frequency reference that is set as the common IF carrier frequency signal of the test system. The crystal controlled IF carrier signal, besides being the reference frequency of the frequency stabilizing closed loop arrangement, serves likewise as the carrier signal supplied in quadrature to a first pair of dual channel IF balanced modulators of an active selective filter unit. In this first poly-modulation operation concerning quadratic functions, a zero IF is achieved.

By referencing the derived mean frequency value to the IF carrier frequency value itself, then the translated two-tone type response spectrum is automatically and precisely positioned to be of mean frequency value equal to the IF carrier frequency value, and is so simultaneously applied to the inputs of the pair of IF balanced modulators. Since frequency-wise, the mean frequency value is equivalent to the carrier frequency value of the translated response spectrum expressed as suppressed carrier double sideband modulation, the product modulation by the IF balanced modulators of equal frequency signals establishes the difference frequency product of zero IF value. Hence the audio frequency components of $M\Delta F/2$ superimpose and displace themselves above the zero IF position between the pairs of modulators of the dual channels. Highly selective audio frequency filtering is then switch selectable within each of the two channels and the desired $(M\Delta F/2)$ term is passed to a second pair of modulators of the audio frequency double balanced type. In this second poly-modulation operation concerning quadratic functions, a zero or DC difference frequency is also achieved. By referencing the generated two tone frequency values to the audio frequency reference source that is likewise supplying the selectable tuning carrier signals in quadrature for the second poly-modulation operation, the product modulation by the audio double balanced modulators of equal selected frequency signals establishes the difference frequency product at DC as required. High pass filtering action passes the sum frequency product of $M\Delta F$ value. In accordance with the theory of quadratic function modulation, the undesired component terms phase cancel in a summation, leaving only the selected signal components $M\Delta F$ of interest which in sequential manner of $M=1, 3, 5$, has its relative amplitude measured and indicated by VTVM means.

ELEMENTARY TEST SYSTEM

With the benefit of the given overall explanation of the principles of operation in accordance with this invention, consider further the essential element of FIG. 2. As shown, the two related signal generating sections are designated the RF two tone test signal section 100 and the audio frequency operating signal section 400. The test system of FIG. 2 further consists of frequency stabilized frequency translation section 500 and output measuring section 300.

RF two tone test signal section 100, which in its simplest form comprises single tone controlled RF two tone generator 101, a difference frequency converter 102 and a phase comparator 103. Generator 101 may be any two-tone generator which essentially consists of separate variable frequency oscillators that generate separate equal amplitude tone signals, say $F_A$ and $F_B$, where $$F_B = (F_A + \Delta F)$$

with $\Delta F$ being of audio difference frequency value, that are linearly combined and added together at the generator output to form the well-known two-tone signal. However, herein single tone control is obtained of one of the variable oscillators, say oscillator generating $F_B$, by having a voltage controlled variable reactance element in its frequency determining circuitry.

This output signal of combined tones $F_A$ and $F_B$, which is shown by typical spectrum 101a, is applied as the test signal input to the unit under test 200. Generator 101 likewise supplies the separate tone signals as inputs of $F_A$ and $F_B$ applied to differential frequency converter 102. Converter 102 consists of conventional mixer and filter, and the signals mix internally therein to develop heterodyne products of sum frequency $(F_A+F_B)$ and difference frequency $(F_B-F_A)$, the applied signal frequencies and various other mixer components. The converter 102 is selectively set to pass only the lowest frequency term, which is the audio frequency difference product of $\Delta F = (F_B - F_A)$, and readily suppress all other frequency terms. The $\Delta F$ signal output of converter 102 is applied to one input of phase comparator 103. Phase comparator 103 receives its $\Delta F$ reference signal input from the generating stages of audio frequency operating signal section 400.

Audio frequency operating signal section 400 functions to produce and provide the operating signals of the test system. Three separate operating signals are supplied by section 400. These operating signals are the following:

Signal (A), of audio frequency value $\Delta F$, which functions as the reference signal for the phase-locking of the frequency separation $\Delta F$ of the generated two-tone signal as described for section 100;

Signal (B), which is the half sine waveform of the full wave rectified $\Delta F/2$ sinusoidal signal, and which thereby is of repetition rate $\Delta F$. This well-known waveform signal of $\Delta F$ frequency, after proper delay, is applied to the switching input of the phase reversal switch in the frequency stabilized frequency translation section 500. Signal (B) thereby functions as the trigger switching signal for the phase demodulation process that results in automatic carrier positioning of the test response spectrum under analysis at exactly the reference carrier frequency location of the selective output measuring section 300.

And signal (C) which is of selectable audio frequency value of $(M\Delta F)/2$, where M may be the factor of 1, 3 or 5. Signal (C) is supplied as the common audio local oscillator signal for the audio dual quadratic modulation process of the output measuring section 300. Signal (C) thereby functions to activate the active selective filter unit 301 of measuring section 300 and provide for the exact audio frequency tuning in the subsequent measurement of the fundamental component and 3rd and 5th odd order intermodulation products of the test response spectrum under analysis.

Audio frequency operating signal section 400 essentially comprises tunable oscillator 401, divider 402, difference frequency converter 403, selective switch 404, rectifier 405 and low pass filter 406. The operating signals (A), (B), and (C) are derived in the following manner. Variable frequency audio oscillator 401 is set tuned to generate audio frequency $f_A$, wherein $f_A$ is of a frequency value that is five times one half the frequency separation that is desired between the two tone RF frequencies of the test signed from section 100, that is $f_A = 5\Delta F/2$. The output from oscillator 401 is applied over three paths, one path being to divider 402, another path feeding to one input of audio differential frequency converter 403, and the third to contact 5 of triple throw, single pole "M" term selector switch 404. Frequency divider 402 is of a 5:1 division ratio such that with suitable low pass filtering at its output, sinusoidal audio frequency of $\Delta F$ c.p.s. value is obtained. Hence divider 402 may encompass a Schmitt trigger input circuit to operate from sine wave input, pulse divider of multivibrator type of 5:1 ratio and low pass filter or shaper buffer amplifier to produce sinusoidal waveform at its output. The signal $\Delta F/2$ is connected at contact 1 of selector switch 402 and to the input of full wave rectifier 405. The full wave rectified output becomes a non-positive signal by rectifier inverting action on input signal $\Delta F/2$, and the well known half-sine waveform of $\Delta F$ c.p.s., repetition rate, as shown at 405a, is produced. Rectifier 405 output is then suitably coupled and applied to the trigger input of the phase reversal switch 504 in the frequency translation section 500. Here the wave-form functions as operating signal (B), which is triggering signal actuating the switch operation at its zero point positions of $\Delta F$ rate.

The other path of the rectified output feeds to variable low pass filter 406, which has its cut-off frequency set at slightly above $\Delta F$ c.p.s. Filter 406 thereby passes only the fundamental frequency component of $\Delta F$ c.p.s. of the full wave rectified waveform applied to it, and sharply rejects all other frequency components of the waveform. The fundamental sine wave output of the filter is applied to the reference input of phase comparator 103 of test signal 100 and serves as operating signal (A) and also to the other input of audio differential frequency converter 403, wherein heterodyning takes place with the $(5\Delta F/2)$ signal applied from variable frequency audio oscillator 401. The selected difference frequency output of converter 403 is thereby of frequency value $(3\Delta F)/2$ and is connected to contact 3 of selector switch 404. The operating signal (C) is obtained from the pole of selector switch 404. Thus audio carrier frequency signal of $M\Delta F$ is respectively selectable from $M = 1, 3, 5$ from contact positions 1, 3 and 5.

Unit under test 200 has the RF two tone test signal from section 100 applied to its input. The resultant two tone type RF response output from the unit under test 200 comprises the two tone frequencies and intermodulation distortion components due to existing non-linearities of the unit 200, and a typical spectrum sketch of the distribution of various main tone and intermodulation frequency component is given at 200a.

The resultant RF response output of unit under test 200 is applied to the input of frequency stabilized frequency translator section 500, which in conjunction with the output measuring section 300 provides for the wave analysis of the test response output with the subsequent relative amplitude measurement of the fundamental and intermodulation signal components of the applied wave.

Frequency stabilized frequency translation section 500 functions to down-frequency convert the RF test signal response output of the unit under test 200 to be precisely centered at the IF carrier frequency of the active selective filter unit 301 in the output measuring section 300, and to thereafter automatically maintain the position of the translated spectrum stabilized exactly at the IF carrier frequency location.

Frequency translation section 500 essentially comprises RF attenuator 501, RF to IF. Frequency converter 502, amplitude limiter 503, phase reversal switch 504, phase comparator 505, IF carrier crystal oscillator 506, voltage controlled variable reactance 507, and variable frequency local oscillator 508. Automatic carrier positioning and frequency stabilization within the frequency translation section 500 occurs in the following described manner. After suitable attenuation to a proper input signal level by variable input attenuator 501, the RF test response output is applied as the input signal to RF to IF frequency converter 502. The local oscillator signal input to frequency converter 502 is supplied from the output of variable frequency local oscillator 508 which has its frequency tuned to be, say, greater than the mid-frequency value of the applied RF test response output by an amount equal to the intermediate frequency (IF) carrier value of the test system. With $f_m$ representing the mid-frequency value of the test spectrum content and $f_{IF}$ representing the IF carrier value of the test system, then the local oscillator signal frequency to converter 502 is equal to $(f_m+f_{IF})$. RF to IF frequency converter 502, which in elementary form consists of a mixer and a fixed tuned IF filter, is set to select and produce only the difference frequency products of the two heterodyned signals at its output. Accordingly, the input spectrum is thereby down frequency converted from about its RF mid-frequency value of $f_m$ to about the IF value of the system. The converter 502 applies its translated spectrum output over three paths. One path feeds the input of amplitude limiter 503, while the other two paths apply the converter output simultaneously to the separate IF balance modulator inputs of the active audio tuned selective filter unit 301 in the output measuring section 300. Considering the first path, amplitude limiter 503, which may be of the double diode wave clipping type, operates on the applied complex IF signal waveform to produce at its output a constant amplitude waveform that constitutes a phase modulated square wave.

The phase modulated signal output from limiter 503 is fed as the input to phase reversal switch 504. The phase reversal switch 504 is electronic in nature and alternates between two internal signal paths of opposite phase in accordance with the repetition rate of the switch triggering signal supplied from the previously described audio frequency operating signal section 400.

Accordingly, one path is direct or of zero degree shift and is shown passing through closed switch position to the common output. The other path is inverted or of 180 degree phase shift and is shown connected to the open switch position. Upon the next trigger pulse at ΔF interval, the switch conditions reverse and the phase inverted signal appears at the common output. This phase reversal action is repeatedly maintained and removes the phase variation from the applied phase modulated waveform.

The resultant output of phase reversal switch 504 is then a single frequency signal without phase modulation components of essentially IF carrier frequency value $f_{IF}$, and becomes the input error signal to phase comparator 505. The reference frequency of $f_{IF}$ ref. is supplied to the other input of comparator 505 from IF carrier crystal oscillator 506 which is being controlled by $f_{IF}$ reference crystal unit 506A. The output of IF carrier crystal oscillator 506 is also being simultaneously supplied as the common IF carrier signal for the separate IF balanced modulators of the active selective filter unit 301 in the output measuring section 300.

Phase comparator 505 produces a DC voltage at its output that is proportional to the phase difference in magnitude and direction between the two signals being applied to it, and applies its output to voltage controlled variable reactance 507.

Voltage controlled variable reactance 507 responds to the amplitude and polarity of the DC correction voltage from comparator 505 output and thereupon coacts in conversional manner with the frequency determining circuitry of variable frequency local oscillator 508. Accordingly, the local oscillator signal frequency is varied until the two signals being applied to phase comparator 505 lock exactly in phase within the control loop. Thus the test response spectrum under analysis appearing at the output of frequency converter 502 has its mid-frequency location precisely and automatically positioned to be at the exact IF carrier frequency value being generated and applied for the active selective filter unit 301 of output measuring means 300.

Output measuring section 300 functions to selectively filter the frequency components of the RF to IF translated two-tone test response output of the unit test 200 in a tunable manner at audio frequency range and thereby measure and indicate the relative amplitude levels of each selected term. Section 300 comprises active audio tuned selective filter unit 301 and rectifier-voltage indicator 302.

Active selective filter unit 301 is being supplied with the proper level and frequency value carrier signals for its duel channel poly-quadratic modulation operation, wherein the first pair modulators received the common IF carrier frequency from IF carrier crystal oscillator 506 of translator section 500, and the second pair of modulators have the common audio carrier signal (C) of selectable frequency MΔF/2 supplied by audio section 400.

In accordance with the theory of quadratic functions, and to be fully detailed in the following paragraphs on the output measuring section, for the moment suffice it to say that the particular spectrum component of interest is selectively filtered and subsequent phase cancellation of undesired components occurs in the summation process, along with the simultaneous establishment of other undesired components as being DC in nature. Thereupon variable high pass filter action selects the resultant audio signal output of the active selective filter unit 301. The selected signal output is of relative proportional amplitude and is of a frequency value that is twice the frequency of the common audio oscillator signal applied from the audio frequency operating signal section 400, or equal to MΔF, where M as selected may be 1, 3, 5. The amplitude of the output signal of MΔF is directly related to the amount or degree of distortion, whereby with $M=1$, the amplitude is proportional to the fundamental or main RF tones ($f_2$ or $f_1$) amplitude of the response output, proportional to the 3rd (upper or lower) odd order difference frequency intermodulation component of the response output for $M=3$, and proportional to the 5th IM term with $M=5$. Rectification of audio signal output MΔF and measurement of its amplitude is made and indicated by rectifier and voltage indicator 302.

DETAILS OF TEST SYSTEM

Figure 3:
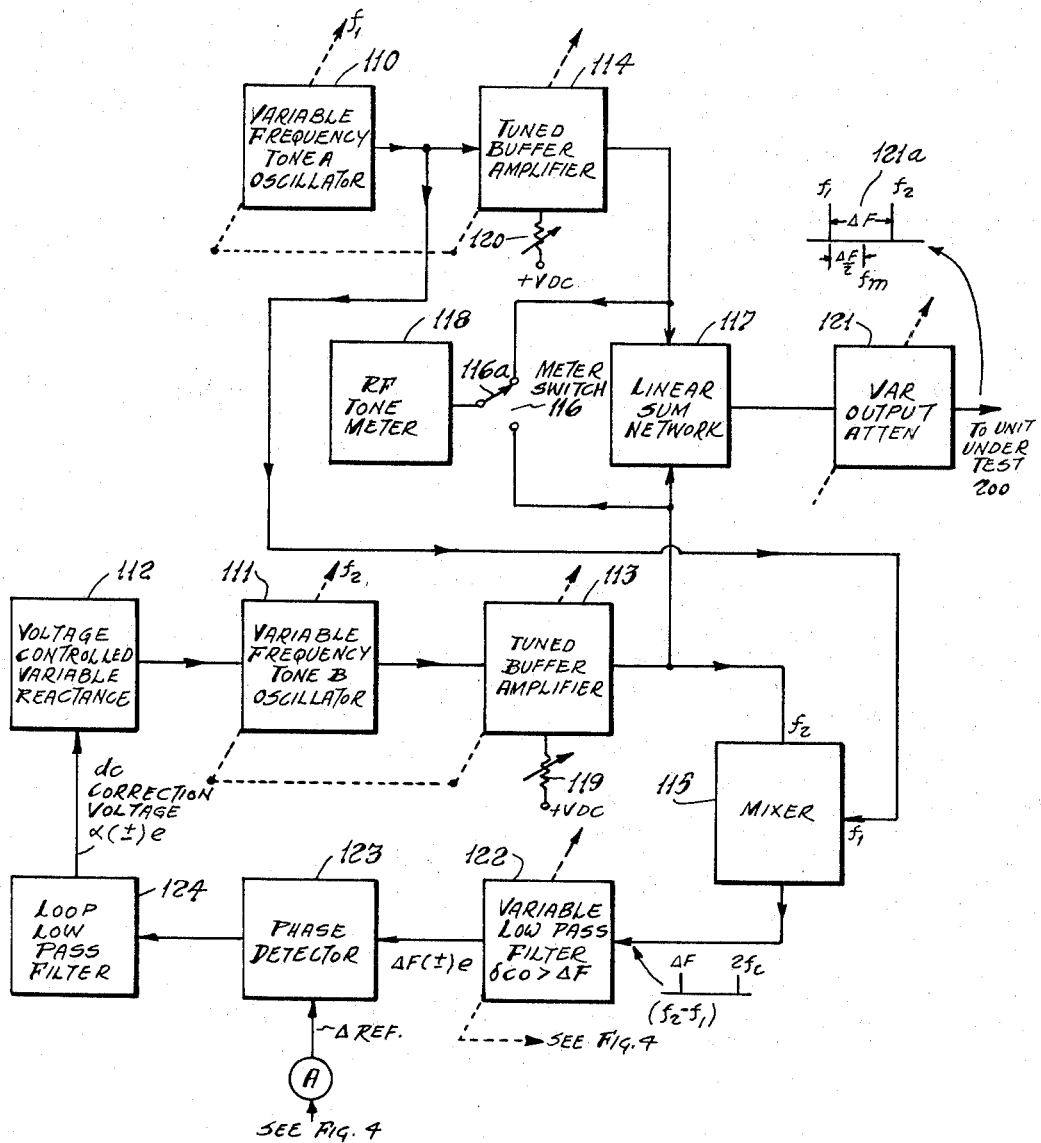
FIG. 3 is a detailed block diagram of a practical embodiment of the RF two tone test signal generating circuits arrangement of the test system in accordance with the invention.
Figure 5A:
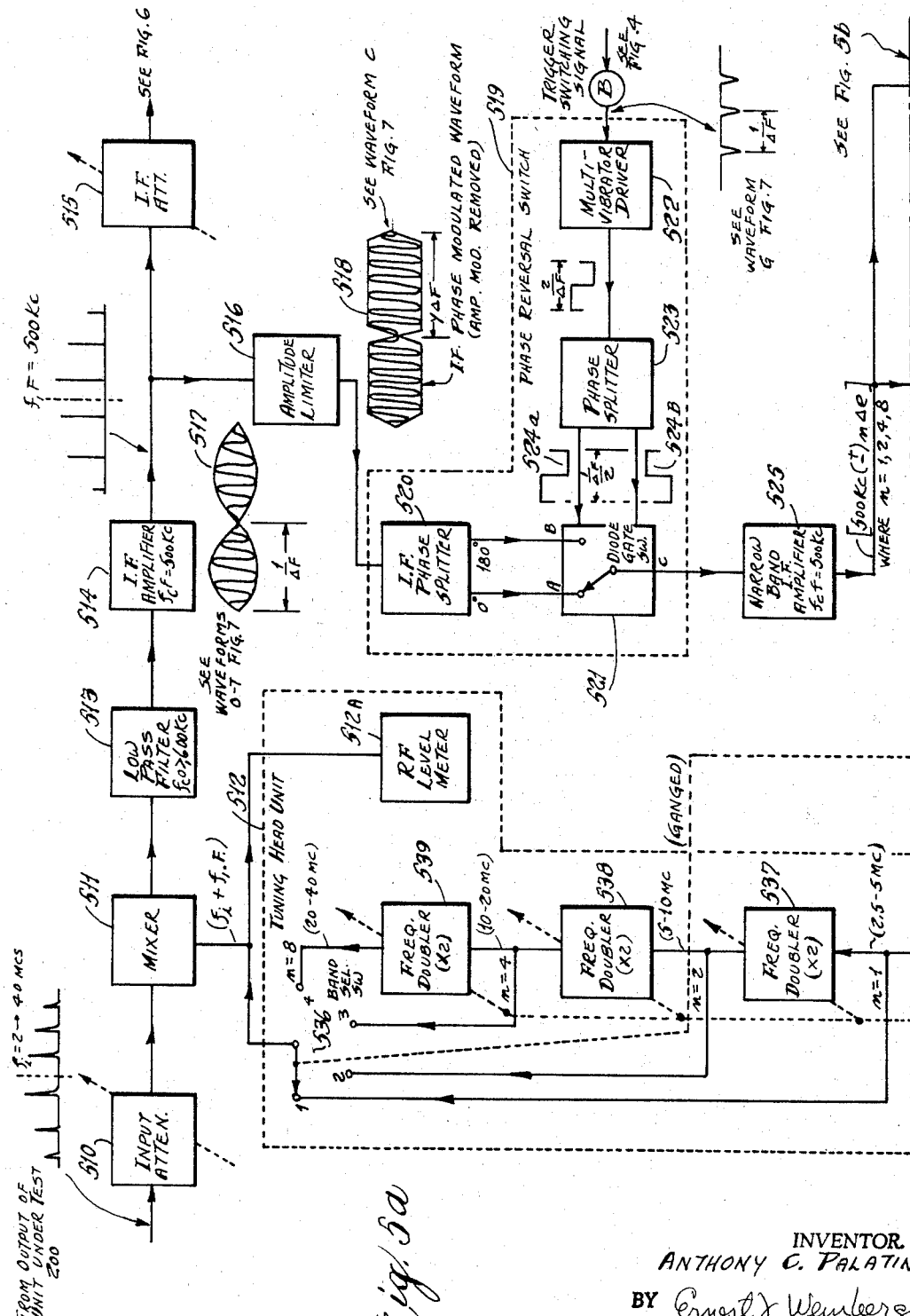
FIGS. 5a and 5b are a detailed block diagram of a practical embodiment of the stabilized frequency translation circuit arrangement of the test system.
Figure 5B:
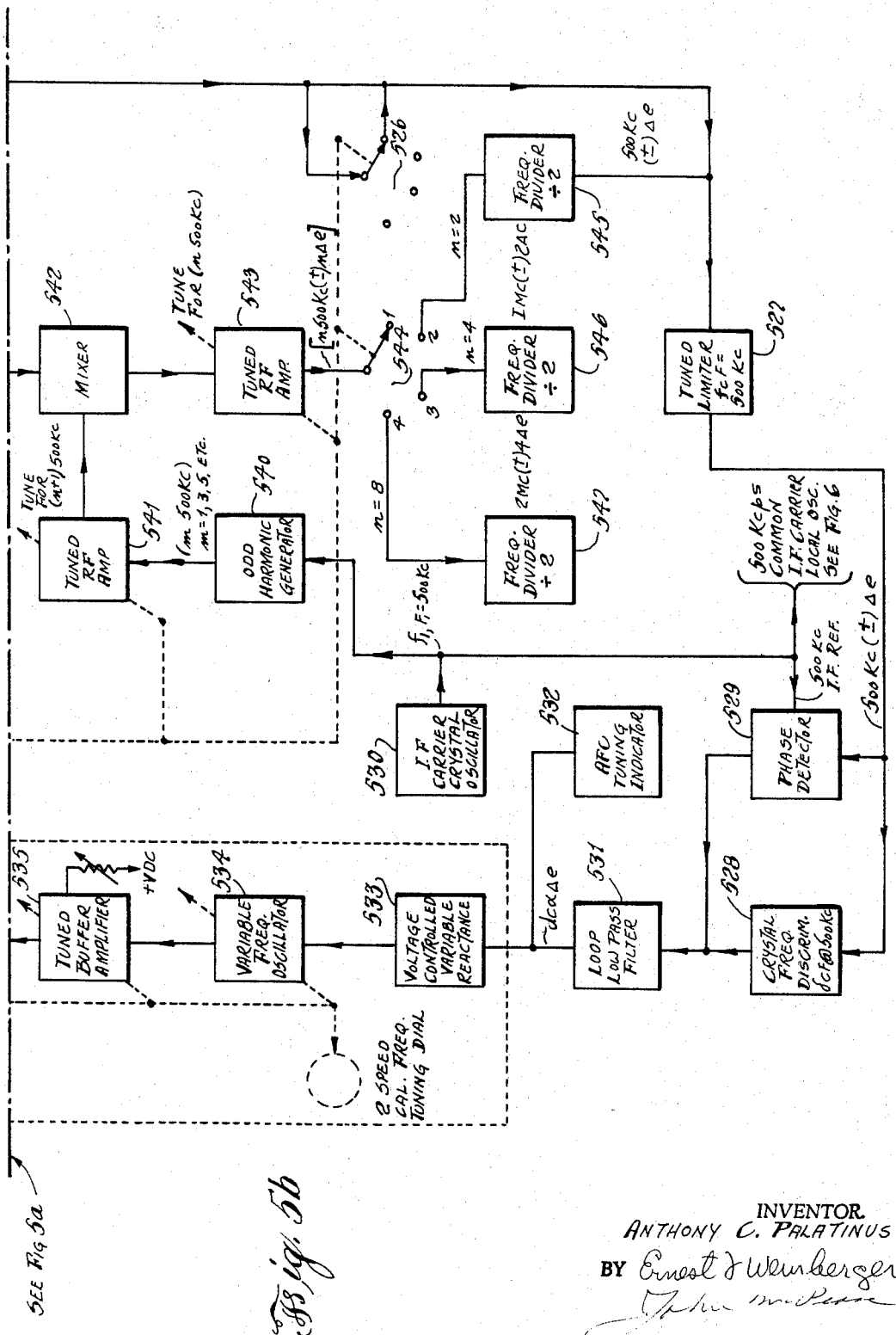

Having described and made clear the novel feature and advantages of the essential elements concerned with the overall apparatus of this invention and the unique method that it implements as represented by the general embodiment given in FIG. 2, let us now consider the detailed description of this invention's associated apparatus presented in four functional sections in sequential order as a matter of convenience. Accordingly, FIG. 3 illustrates an embodiment of the circuit arrangement of the test systems audio frequency separation phase locked RF two tone test signal section 100. FIG. 4 is a further detailed embodiment of the audio frequency operating signal section 400. FIG. 5 concerns the details of a more novel implementation of the featured automatic carrier positioning innovation for the frequency stabilized frequency translation section 500, that serves to supplant frequency synthesizer operation. FIG. 6 deals with the embodiment of the output measuring section 300. Then an integrated description with the aid of waveforms given in FIG. 7 concerning the automatic carrier positioning operation is presented, and also covers practical test cases. Finally, a description is given of the novel implementation of this invention to readily accommodate coverage of a wide frequency range operation in a self-operative manner as illustrated in FIG. 8.

RF TWO TONE TEST SECTION 100 (FIG. 3)

Refer now to FIG. 3, which is a detailed embodiment of RF two tone test signal section 100. Variable frequency tone A oscillator 110 is tuned to generated RF tone frequency $f_1$ and similar type variable frequency tone B oscillator 111 is independently set and tuned to supply RF tone frequency $f_2$. Oscillator 111 has voltage controlled variable reactance 112 associated with the frequency determining elements of its circuit configuration in conventional manner known by the art. Tone frequency $f_1$ of oscillator 110 is applied over two paths, one path being to tuned buffer amplifier 114 and the other path to one input of mixer 115. Tone frequency $f_2$ of oscillator 111 is applied to tuned buffer amplifier 113 and is also applied to the other input of mixer 115. The outputs of tuned buffer amplifiers 113 and 114 are separately applied over two paths, one of these paths being connected to contacts 1 and 2 respectively of meter switch 116 and the other of the paths leading to the separate inputs of linear sum network 117. The wiper 116a of meter switch 116 connects either tone frequency signal $f_1$ or $f_2$ from contact 2 or 1 respectively to RF tone meter 118. Variable potentiometers 119 and 120 of tuned buffer amplifiers 113 and 114 respectively function as amplitude control means in the setting of the tone amplitudes to equal levels as determined by precalibrated marking on scale of meter 118. Variable potentiometers 119 and 120 of tuned buffer amplifiers 113 and 114 respectively function as amplitude control means in the setting of the tone amplitudes to equal levels as determined by precalibrated marking on scale of meter 118. Amplitude adjustment by way of variable D.C. voltage control of the screen grid of amplifier tubes is conventional in the art.

The two equal amplitude tone signals are linearly summed and combined at the output of linear sum network 117 and thereby forms the well known RF two tone signal waveform. The two tone signal is fed to variable output attenuator 121 which adjusts the output level of the test signal to be applied to unit under test 200. Typical spectrum sketch of the two tone test signal is shown at 121a, where $\Delta F$ represents the audio difference frequency value between the tone frequencies. The stabilization of the difference frequency value is brought about in the following way. Mixer 115 heterodynes applied input signals $f_1$ and $f_2$ and produces sum and difference frequency products of $2f_m = (f_1+f_2)$ and $\Delta F = (f_2-f_1)$ as its output components along with the two applied signal frequencies. Variable low pass filter 122, having its cut-off frequency, $f_{co}$, set to be slightly greater than the value $\Delta F$, passes unattenuated the different frequency component $\Delta F$ of mixer 115 output; and due to its sharp skirt readily attenuates all other components. The output of low pass filter 122 is fed to one input of phase detector 123. The other input to phase detector 123 is the $\Delta F$ reference signal, which is operating signal (A) generated by audio frequency operating signal section 400 of FIG. 4. The D.C. correction voltage output of phase detector 123 is applied to voltage controlled variable reactance 112 after passing through loop low pass filter 124.

Accordingly. the reactance 112 changes the output frequency $f_2$ of oscillator 111 to bring about, and thereafter maintain, the phase locking between mixer 115 $\Delta F$ output and $\Delta F$ reference signal (A).

The various stages of FIG. 3, along with the circuits arrangement illustrated, may be readily interchanged with conventional circuitry. By way of example, variable frequency oscillator-tuned buffer amplifier combination 110 and 114, or 111 and 113, may be similar to the later on described embodiment of the tuning head unit of frequency stabilized frequency translation section 500. In general, any RF two tone generator that allows for the automatic phase control (APC) of its frequency difference value in a like manner is then directly suitable within the invention test system.

In measuring intermodulation spectra in practical systems, it is often desired to make such measurements at several drive levels, since the relative levels of the intermodulation components are found to be sensitive to the drive level applied. Variation and setting of the particular selected drive levels at the test signal source section 100 output is obtained by way of variable attenuator 121.

AUDIO FREQUENCY OPERATING SIGNAL SECTION 400 (FIG. 4)

The audio frequency tuning of the activated selective filter 301, that will be explained in reference to FIG. 6, is herein accomplished using a novel non-harmonic generation technique, while use is made of a selective audio frequency multiplication method illustrated and described in the self-operative method and application concerning FIG. 8. The audio frequency operating signal section 400 as illustrated in elementary block diagram of FIG. 2 allows for the measurement of only up to the 5th odd order difference frequency intermodulation product in the RF response, since 7th and higher order IM terms are normally not of concern or interest. This frequency division non-harmonic type approach as disclosed, is of significant benefit over the multiplication process in that rapid switchable selection of the "M" factor terms of interest, that is $M=1, 3, 5$, is more ready attained.

Examine now in detail, as shown by FIG. 4, an embodiment of the audio frequency operating signal section 400. Tunable audio oscillator 410 is set to audio frequency, $f_A$, where $f_A$ is chosen to be of frequency value $(5\Delta F)/2$ or five times one-half of the audio frequency separation $\Delta F$, between the generated test signal RF tone frequencies $F_A$ and $F_B$. This stable audio oscillator may be any suitable variable frequency audio oscillator of fairly constant output amplitude over its tuning range. In normal RF two tone testing, only a selectable number of frequency separation internals need be applied where say, for the shown test system of the present invention, suitable $\Delta F$ separations of 100 c.p.s., 250 c.p.s., and 500 c.p.s. would be generated. Accordingly a preferable example of variable oscillator 410 would be of the conventional bridged T, digitally selectable audio oscillator configuration.

While the digital frequency selection made provides for the generation of $5\Delta F/2$, the selector switch position may be calibrated to indicate the $\Delta F$ value of the two tone test signal being generated.

The output of oscillator 410 is supplied over three paths. One signal path directly connects to contact 5 of triple throw, single pole (3T-SP) M factor selector switch 411; another path supplies the signal output as the carrier signal input to double balanced modulator 412; and the third path applies the oscillator audio frequency signal of $(5\Delta F)/2$ to the input of 5:1 pulse frequency divider 413. Divider 413 may be of the common bistable multivibrator type having a Schmitt trigger input circuit to permit digital division of 5:1 from the sinusoidal signal source of oscillator 410. Such divider units may be operated at any frequency up to its rated maximum without adjustment or tuning. Herein the rated maximum input frequency is much greater than the maximum frequency to be obtained from oscillator 410. The output waveform of divider 413 is then a pulse of repetition frequency $f_A/5$. Since any periodic waveform consists of fundamental and higher harmonics, suitable low pass filtering may select the fundamental only and produce a sinusoidal output. The divider 413 output of $f_A/5$ or $\Delta F/2$ is fed by capacitive coupling to variable low pass filter 414. Low pass filter 414 has its cut-off frequency set at slightly greater than $\Delta F/2$ value and passes fundamental frequency ΔF/2 unattenuated, while its sharp and rapid attenuation rate for frequencies greater than ΔF/2 readily suppresses all other frequency components. The sinusoidal frequency output of ΔF/2 from filter 414 is applied over two paths. One path leads to contact I of selector switch 411 and the other path is to the input of full wave rectifier 415. Rectifier 415, which may be the conventional resistance loaded full wave rectification type circuit, functions to develop the second harmonic of the input signal ΔF/2 and likewise to provide a replica of the detected envelope of the generated two tone test signal to be simultaneously used, after suitable delay, as the precise triggering signal for the phase reversal switch of frequency translator 500. Full wave rectifier 415, being of reverse biased diode connection inverts the position going portions of the sinusoidal wave of ΔF/2 c.p.s., the resultant rectifier output being like well known waveform shown sketched at 415a. Fourier series expansion of full wave rectified signal Sin $2\pi (\Delta F/2)t$ is as follows:

$$FWRe(t) = -\frac{2}{\pi}\left[1 + \frac{2}{3} \cos 2\pi (\Delta F)t - \frac{2}{15} \cos 2\pi(2\Delta F)t + \ldots\right]$$

wherein the fundamental component is $\cos 2\pi(\Delta F)t$ or of twice the frequency of the input signal.

As is common practice, full wave rectifier 415 may have a step-up voltage transformer at its input such that the resultant half sine-wave waveform develops sufficiently sharp, positive-going, "pips" at 1/ΔF c.p.s.

The rectified signal is fed over two paths. One path leads to variable Time Delay Network 416, which being adjustable, is set to compensate for the envelope delay characteristics of the unit under test 200, and thus insure the precise switch triggering action required for the phase reversal switch action.

The RF two tone test waveform formulated of two equal amplitude closely adjacent components of angular frequencies $(W_1 = 2\pi f_1)$ and $(W_2 = 2\pi f_2)$ undergoes envelope delay in its transmission path through the unit (or system) under test 200. Say $W_1$ has a phase shift of $\phi(W_1)$ and $W_2$ then shifts by $[\phi(W_1) + \Delta\phi(W_1)]$, thus for angular velocities of $W_1$ and $W_2$, phase coincidence periodically occurs at a rate equal to the reciprocal of the envelope frequency ΔF, or at 1/ΔF intervals the peaks or minimum values of the resultant wave envelope develops.

The phase time relationship between the phase modulation components and the simulated amplitude modulation component is brought about by the equalization of this transmission time delay thru the setting of time delay network 416 to delay the FWR waveform ΔF. In general, since the relative phase shift between the two component frequencies is $\Delta\phi(W_1)$, the resultant envelope delay time becomes $td = \Delta\phi(W_1)/\Delta F$, and the triggering signal is so equally delayed by the operator prior to measurement.

The envelope delay characteristic of the type units (or system) under test may be made and pre-determined using standard envelope delay measurement techniques practiced in the art. Thereafter, this data is used as reference with time delay network 416 likewise possessing pre-determined delay compensation for the test spectrum response signal processing path through mixer IF amplifier of RF to IF translation section 500 and for the trigger and switching action. Consequently, the exact adjustment of the trigger signal delay is made and noted by the subsequent operation of the AFC tuning indication of the frequency translator section 500 signifying the proper action of the phase reversing switch in the stabilization process.

To now secure a more distinct "pip" for the precise triggering action, the time compensated full wave rectified waveform is further applied to the input grid of a high-grain triode amplifier of switch trigger stage 421. This stage 421 is quiescent at AC zero level grid voltage and produces a negative going needle pulse output, which thereupon becomes operating signal (B), whenever the input signal it receives reaches or exceeds its zero level and causes the triode to readily conduct.

For each momentary time that a zero level is reached by the time compensated FWR waveform, switch trigger stage 421 conducts heavily to thereby immediately generate a rapid negative directed, sharp and substantial trigger spike waveform that is more suitable for the multivibrator control required of the phase reversing switch action of the frequency translator 500.

The other path of the rectifier output is capacitively coupled to remove its D.C. component, and the rectified A.C. output is fed to variable low pass filter 417. Low pass filter 417 has its cut-off frequency set at slightly greater than ΔF c.p.s. value and passes the fundamental frequency component ΔF of the rectified waveform unattenuated, while its sharp and rapid attenuation rate for frequencies greater than ΔF readily suppresses all other frequency components.

The sinusoidal frequency output of ΔF c.p.s. from filter 415 is applied over two paths. The first supplies the ΔF signal as the reference frequency signal to phase detector 123 of test signal section 100 for phase locking purposes as described earlier. Over the other path, the ΔF signal from filter 415 is fed to the input of double balanced modulator 412 as its input modulating signal. Modulator 412, which may be of the conventional ring diode product modulator type or say a Hall effect device multiplier, which are normally double balanced, produces a double sideband (DSB) output with both carrier and input signal suppressed. Accordingly, the DSB output consists of the upper sideband or sum frequency product of $(5\Delta F/2 + \Delta F) = 7\Delta F/2$ and the lower or difference frequency product of $$(5\Delta F/2 - \Delta F) = 3\Delta F/2$$

The output of modulator 412 is applied to variable low pass filter 418. Low pass filter 418 has its cutoff frequency set at slightly greater than 3ΔF/2 c.p.s. value and passes difference frequency product term 3ΔF/2 unattenuated, while its sharp and rapid attenuation rate for frequencies greater than 3ΔF/2 readily suppresses all other frequency components. The 3ΔF/2 signal output from filter 418 is connected to contact 3 of selector switch 411. Selector switch 411 thereby has audio frequency tuning signals of MΔF/2 c.p.s. at its three positions, where M=1, 3 and 5. At contact 1 for M=1, is signal ΔF/2; in the selector switch second position at contact 3 the signal is 3ΔF/2 for M=3; and finally in the third switch position 5ΔF/2 is obtained at contact 5 for M=5 factor selection. The wiper 411a of selector switch 411, shown in position 1, applies the selected "M" factor signal to the input of variable gain audio amplifier 419. The output of amplifier 419 then becomes signal (C) which is the common audio local oscillator signal supplied to bring about the audio frequency tuning of the active selective filter unit 301 in the output measurement section 300.

The frequency response characteristic of amplifier 419 is relatively flat over a range greater than the maximum value of $f_A = 5\Delta F/2$, which say may be 5 kc.p.s.

The amplitude of signal (C) may be set by way of selector switch 420 which connects to pre-calibrated metering means of the output measuring section 300.

As suitable example, variable low pass filters 414, 417, 418, and also filter 122 of FIG. 3, may be of the active RC filter circuit type described later on in refernce to FIG. 6. Whereas in such an embodiment as shown, only interval selection of an adequate number of ΔF values need be made, then convenient ganged selector switch operation may be applied.

AUTOMATIC CARRIER POSITIONED FREQUENCY TRANSLATION SECTION 500 (FIG. 5)

As noted in FIG. 2, the overall output signal processing means of this invention's apparatus may be considered to constitute two main sections. One section is given in detail block diagram form in FIG. 5 and designated the frequency stabilized frequency translation section 500, while the other section given as shown in the circuits arrangement of FIG. 6 is, for purposes of convenience, referred to as the Output Measuring Section 300. Consider now in detail, the functioning and operation of the circuits arrangement of FIG. 5 which performs, in accordance with the following described manner, to frequency convert the main RF tones and their intermodulation term content from their mean or center frequency value in the high frequency region of, say, 2–30 mcs. to the predetermined fixed IF carrier frequency value of say 500 kc.p.s. It is to be recognized that the illustrated embodiment given in the basic circuits arrangement of FIG. 2 essentially concerned itself with operation of the generalized functional stages of section 500 to aid in the explanation of the overall operation of the inventive method and apparatus. The detailed circuit arrangement of FIG. 5 uniquely allows for the continuous control operation of the tunable local oscillator in a novel manner when supplied and controlled by the generated trigger signal of FIG. 4 in accordance with the invention.

Returning now to the unit under test 200, its RF two tone test response output, which is being analyzed and measured, and consists of the high frequency two-tone signal and its accompanying distortion product terms is directly applied to the input attenuator 510 of the Frequency Translation Section 500. The variable attenuator 510 serves to reduce the output signal to a suitable level for proper signal processing by the succeeding stages of the translating and measuring sections. The output of the attenuator is fed to the input of mixer 511. The local oscillator signal being applied to the mixer 511 is supplied by tuning head unit 512, which is a controlled variable frequency oscillator source. The tuning head unit 512 is accordingly tuned, set and thereafter frequency controlled at a frequency value that is above the center frequency value of the incoming spectrum being translated by a predetermined IF carrier frequency, $f_{IF}$, which in this example is to be 500 kc.p.s. The local oscillator signal output is monitored by RF level meter 512A which may be the suitably switched RF tone meter of the two tone generator of FIG. 3, and is set to a proper signal level at the mixer 511 to provide a proportional linear relationship between the mixer's input and output. Output level adjustment may be brought about in the manner similar to buffer amplifier amplitude control shown for the two tone generator of FIG. 3, or suitable output amplitude control of the final multiplier in use in the case of the illustrated embodiment.

In the heterodyning of these two signals in mixer 511, the sum and difference frequency products along with the input and local oscillator signal appear in the mixer output. The mixer output is applied to low pass filter 513, having a cut-off frequency greater than the maximum difference frequency value, say 600 kc.p.s. Filter 513 acts to readily suppress the higher frequencies and any other undesired spurious signals that may exist in the mixer output. Low pass filter 513 output becomes the input to IF amplifier 514 which has its center frequency value at 500 kc.p.s. and possesses a flat uniform bandpass region having a bandwidth of say 50 kc.p.s.

The attenuation beyond the bandpass of IF amplifier 514, which may be of conventional design and may consist of two or more stages, acts to readily suppress all other signals and selectively pass the difference frequency components, that is, the sharp skirt selectivity characteristic of the IF amplifier stages 514 allows unattenuated passage of the difference frequency products output only and eliminate all other signals emanating from mixer 511. The incoming RF two-tone type response spectrum to be examined is made up of a sideband component distribution about a center or mean frequency value of $f_c$, where $f_c$ may be any frequency value say in the high frequency region between 2–30 mcs., and constitutes the upper and the lower main and intermodulation signal components developed within the bandpass region of the unit under test 200. Since the local oscillator signal frequency $f_{lo}=(f_c+500 \text{ kc.})$, is tuned to be 500 kc.p.s. above the mean frequency of $f_c$, then the resultant difference frequency output of the mixer 502 becomes [$f_{lo}-f_c\pm$ Main tone audio components and IM odd term audio components of $M\Delta F/2$]. Hence, it can be seen that with [$f_c+500$ kc.p.s.$-(f_c\pm M\Delta F/2$ audio terms)] where $M=1, 3, 5$, thereby equaling $$[500 \text{ kc.p.s.}\mp M\Delta F/2]$$

So the incoming spectrum distribution has been translated or down frequency converted from about a mean frequency value of $f_c$ to about the pre-determined IF carrier frequency value of 500 kc.p.s. with a subsequent frequency reversal occuring that now locates component terms originally above the mean frequency of $f_c$, an equal frequency interval below the IF carrier frequency value and vice-versa for incoming component terms located below the mean frequency value. As is known in the art, the spectrum distribution of two tone signal response is commonly symmetrically disposed about the mean frequency value of the two-tone test signal applied. Thus, the frequency inversion of the spectrum components about the new center frequency value is inconsequential. This fact similarly governs and acts upon the upper sideband or the lower sideband IM terms of the test spectrum. However, in those situations of test wherein a specific IM frequency component term is of particular interest, the operational procedure of the invention apparatus can be readily designated to properly indicate the manner of using the inventive method involved to acquire a polarity identification of the sideband component with respect to upper or lower term being examined and measured. Institution of such a feature will become better known and understood as one continues further with the detail description given herein. IF amplifier 514, which may be of moderate gain, supplies the translated spectrum distribution over two separate paths. One path leads to the input of amplitude limiter stage 516, and the other path applies to the I.F. variable attenuator 515. The attenuator 515 has its output going to the modulation inputs of the two IF balanced modulators of the active selective filter unit 301 of FIG. 5 which is so described later on.

Considering the path to the input of the limiter 516, this stage functions to remove the amplitude modulated component of the two tone wave applied and subsequently contains only phase modulated terms in its output. Thus the IF wave output of the limiter 516 represents a phase modulated signal, with constant amplitude, the typical waveform being shown as sketched, 518, along with a sketch 517 of the rather conventional well known RF two tone equal amplitude waveform. Amplitude limiter 516, being untuned and of broad band, allows all significant sideband components of the phase modulated waveform to appear at its output without undue attenuation.

Where envelope distortion of the two tone test signal waveform in its passage through unit under test results, harmonic terms appear in the envelope. However, note is to be made that the fundamental waveform exhibits the delay of the unit under test since the harmonic terms introduce amplitude distortion but cannot change the fundamental components.

In the RF output under analysis, harmonics and sum frequency terms of the two tone test signal also usually develop within the unit under tests's bandpass region and be represented in the spectrum response output at 2nd harmonic components $[2f_c \mp \Delta F]$, and sum terms of $(f_1+f_2)$. Accordingly, LPF 513 and the selectivity of IF amplifier 514 readily eliminates these harmonic and sum terms from the spectrum response under analysis thereby insuring maintenance of sideband structure symmetry as shown sketched.

Limiter 516 acts as untuned overdriven IF amplifier wherein amplitude saturation limiting in plate and grid circuits occurs to produce the constant amplitude, phase modulated wave output.

By way of example, the IF amplifier-limiter stages 516, which in a typical application may be two stages, may make use of a sheet-beam tube, such as General Electric 7763, as the active element device. It is thus able to maintain true phase-fidelity and constant output amplitude with change of input level; and as the sheet beam tube does not limit as the direct result of a change in impedance, it accordingly operates with negligible change in phase shift. The input wave shape to the limiter for example as shown 517 consists of the two combined frequencies $f_1$ and $f_2$, and the resulting wave is varying in amplitude and phase at the difference frequency, $\Delta F$.

The wave shape as shown 518 at the limiter 516 output essentially consists of a phase modulated sine wave of constant amplitude except at the time intervals where abrupt zero crossover occurs; such passage through zero, occurring in coincidence with the zero level points of the amplitude envelope of the input waveform.

Shown now in further detail is an embodiment of phase reversal switch 519, which here comprises IF phase splitter 520, single pole double throw (SPDT) diode gate switch 521, phase splitter 523, and multivibrator type switch driver 522.

The phase modulated output of limiter 516 is then fed to the input of the phase splitting arrangement 520 to bring about two phase modulated signals of opposite polarity. Accordingly, one path is through zero phase stage of phase splitter 520, while the other path is through 180° phase reversing stage of phase splitter 520, which is set to be balanced.

By way of example, wide band phase splitting may be obtained from conventional circuitry wherein a cathode follower is used as a paraphase ampifier with equal plate and cathode loads. Here it is standard practice to couple one output from the cathode circuit of the paraphase amplifier and the other identical out-of-phase signal from the output of a cathode follower circuit that is directly coupled and tied into the plate junction of the paraphase amplifier circuit. Phase splitting configurations of this type are well known in the art.

The pair of outputs of phase splitter 520, with the phase reversal of 180 degrees resulting in signal path designated B and direct zero degree phase connection referred as path A, feed to the contact positions B and A respectively of SPDT electronic switch 521. Electronic switch 521 may be a suitable diode gate switch of single pole, double throw coax type operation, which performs much like a mechanical switch whereby switch position is dependent upon flip-flop output of an associated switch driver.

Accordingly, there now exist two phase modulated signals of opposite polarity, that is, one phase modulated waveform being at contact position A of switch 521 and the other phase modulated waveform being at contact position B of switch 521 but 180 degrees out of phase with the waveform of the signal at contact A. The wiper as schematically represented of the switch 521 is alternately switched between these two positions, that is, contact A or 0° channel and contact B or 180° phase inverted channel, to so connect each path to a common output channel C at a switching rate established by the trigger switching signal $\Delta F$ applied to the switch driving multivibrator 522. The switching signal $\Delta F$ is supplied by the audio frequency operating signal section 400 and from prior description it is known to be controlled by a full wave rectified waveform which is suitably time compensated and of a repetition rate equal to $\Delta F$ c.p.s.

The negative going trigger pulses of $1/\Delta F$ period which corresponds precisely to the zero-axis crossings of a two tone waveform turn the flip-flop multivibrator driver 522 alternately on and off. The on or flip time of the MVB equals the off or flop interval and the total time per cycle or period is then $$\frac{\left(\frac{1}{\Delta F}\right)}{2}$$

The multivibrator 522 output is a square wave voltage of pulse repetition rate $\Delta F/2$ and is applied to phase splitter 523. Phase splitter 523 may be similar to phase splitter 520, and functions to produce two output square waves, where one of the waves corresponds in polarity with the multivibrator output and the other wave is inverted in polarity with respect to it.

Multivibrator driver 522, by way of example, may be of the bi-stable circuit type that is driven from one stable state to the other by the triggering signal. Switching signals outputs 524A and 524B may be coupled from the opposite plate outputs of the phase splitter 523, or as shown in the illustrated embodiment where singular plate output of the multivibrator is directly applied to the switch device, while an inverted plate output from an inverting stage supplies the other switch signals. As for example, for one stable state of the bistable multivibrator 522, one side conducts and the other half of the multi is cut-off giving any waveform 524A which for example is controlling the positioning of SPDT switch 521 to contact A. In the second stable state, the reverse is true, that is the former side which was conducting is now cut-off and the latter non-conducting side now conducts and accordingly, after phase reversal, positions the switch wiper to contact B, as controlled by say waveform 524B. This bi-stable operation performs by the changing of state with the application of each trigger pulse applied to the multivibrator 522.

The resultant two output paths from multivibrator 522 are of symmetrical square wave forms also being in phase opposition, that is, of opposite polarity as shown by waveform sketches 524A and 524B respectively. These switch control voltages are supplied to separate control inputs of diode switch 521.

The switching operation of the diode gate switch 521 electrically is of the coax single pole, double throw action whereby in an alternating sequence either of the two input channels, that is A or B, is connected to single channel output C. A high degree of isolation exists between the two inputs with negligible phase shift between channels, the switch being of high speed and broadband say from 200 kc.p.s. to the VHF region. By way of example, a SPDT solid state electronic coax switch, such as the commercially available Model DS11A Solid State Coax Switch manufactured by Sanders Associates, Inc., New Hampshire, may suitably be used.

The single channel output at C of diode gate switch 521 is applied to narrow band IF amplifier 525, which has its center frequency value at 500 kc.p.s. and say is of 10 kc.p.s. bandwidth. IF amplifier 525 passes only the phase demodulated carrier signal of the phase modulated wave and rejects any harmonics and other spurious signals applied to it. With the phase modulation removed, a continuous wave signal remains which is the carrier signal of the phase modulated wave and is of frequency value $f_c$ equal to the mean frequency value of the translated two tone type IF spectrum response under analysis. The output of IF amplifier 525, which is the carrier signal of frequency $f_c$, is split into two paths. One path is to the input of mixer 542 which functions for multiplication factor $n$ equal to 2, 4, 8, etc., and will be separately described later in relation to multi-band operation of the tunning head unit 512. The other path is to the wiper of band selector switch 526 which is shown in position I for the fundamental unmultiplied band input. In the practical case, the carrier frequency signal possesses frequency error from the IF carrier frequency value, so that $f_c$ can be expressed as 500 kc.p.s. $(\pm)n\Delta e$, where $n$ is the multiplication factor in use by tuning head unit 512, and $\Delta e$ is amount of frequency error which may be either positive or negative. For the fundamental band, $n=1$ and so the carrier signal frequency to position 1 of selector switch section 1c 526 is then of value 500 kc.p.s. $(\pm)\Delta e$.

Position 1 feeds to the input of tuned amplitude limiter 527, which may be of bandwidth 10 kc.p.s. about the center frequency of 500 kc.p.s. and the amplitude limited output is applied over two paths. One path is to crystal frequency discriminator 528 and the other to the input of phase detector 529, wherein frequency and phase comparisons are respectively made. Discriminator 528 and detector 529, like conventional comparators are subject to amplitude variation errors of the input signal and limiter 527 functions to remove such amplitude variations from the applied carrier signal. Frequency discriminator 528 functions to produce a polarized dc voltage proportional to the difference betwen the applied input frequency of the carrier signal and the designed reference center frequency value of the discriminators characteristic curve, which in the given case is 500 kc.p.s. Discriminator 528, by way of example, may be of the conventional quartz crystal type as shown or a frequency discriminator known to the art.

IF carrier crystal oscillator 530, which is crystal stabilized at the carrier IF frequency value of 500 kc.p.s., supplies its signal output over three paths. One path is to the 1st pair of IF balanced modulators of active selective filter unit 301 and acts as the common IF carrier signal in the filter process described hereinafter.

The second path feeds the 500 kc.p.s. signal to odd harmonic generator 540 and will be described in conjunction with multi-band operation.

The third path applies the IF carrier frequency signal (500 kc.p.s.), as the reference frequency signal to the other input of phase detector 529.

Phase detector 529 functions to produce a polarized D.C. voltage in its output circuit that is proportional to the difference in phase between the applied input carrier signal and the reference crystal controlled carrier frequency of 500 kc.p.s. The subsequent D.C. error voltage outputs of frequency discriminator 528 and phase detector 529 are connected in series and applied through loop low pass filter 531 to the voltage controlled variable reactance element 533 of variable frequency oscillator 534. Loop low pass filter 531, may be of passive R.C. circuitry and acts to stabilize the overall loop gain characteristics of the closed loop circuity. Voltage controlled reactance 533, which may be a voltage sensitive variable capacitance diode, in its association with the tunable inductance capacitance network of the variable frequency oscillator 534 determines the output frequency of this oscillator. Within the closed loop arrangement, voltage controlled reactance 533 varies, in response to the D.C. correction voltage being supplied by the comparators 528 and 529; to accordingly coact with the frequency determining circuitry for variable frequency oscillator 534 in the conventional manner to thereby change its frequency of operation such that the two signals being applied to the phase detector 529 are locked in phase. Thus, the polarity and amplitude of the two separate discriminator output voltages are additively combined in their proper sense and therein provide the summed compensating voltage to the voltage controlled variable reactance 533.

Frequency discriminator 528 and phase detector 529 thereby operate concurrently in a combined manner whereby the automatic control due to frequency discriminator 528 is of a coarse nature which has a large capture range to permit the closing of the frequency difference in the control loop to within the narrow capture range of the phase detector 529. Combined frequency-phase comparators are known in the art, a suitable example of which is referenced in McGraw Hill 1964 publication, "SSB Principles and Circuits" by E. Pappenfus.

The overall effect of such combination signal comparison is that unless the applied input carrier signal and the reference IF carrier signal are of equal frequency value and exactly in phase, a polarized D.C. correction signal is applied to the voltage sensitive variable reactance element 533 to change the frequency of operation of variable frequency oscillator 534 in the conventional manner until the phase looking of the two signals is attained.

Conventional AFC tuning indication is supplied by AFC tuning indicator 532, which monitors the D.C. correction voltage output from loop low pass filter 531.

The frequency associated with the tuning of variable frequency oscillator 534 of tuning head unit 512 may be accurately calibrated to indicate at 500 kc.p.s. below the frequency value being applied to mixer 511 and, upon automatic carrier positioning to give a direct frequency reading of the means frequency value of the two tone R.F. test signal being generated. A two speed tuning gear mechanism may be used, wherein the rapid speed is usable for coarse tuning and the slower speed is then applied for fine tuning adjustment to bring the translated mean frequency value of the response spectrum within the capture range of the crystal frequency discriminator 528, whereupon automatic operation thereafter takes place as described above.

Within the closed loop arrangement, variable frequency oscillator 534 may by itself be of such configuration as to be a substantially stable, well constructed, mechanically tunable oscillator. Whereas it is intended to provide such wide frequency coverage of say 2–40 mcs., this operation usually is best accomplished by conventional stable tunable oscillator-frequency multiplier arrangement. In typical embodiments of this nature, the main frequency tuning of the basic range may well be made by substantially linear variable inductance tuning and accordingly from the description given for the basic unmultiplied tuning range, the control loop bandwidth is therein sufficient to allow automatic carrier positioning action to occur. To thereupon maintain the basic range control bandwidth established, a technique of range selection frequency translation and frequency division is herein introduced within the path of the mean IF frequency signal that is being error compared to the reference IF carrier frequency signal.

Having described the loop operation of automatic carrier positioning control for the basic frequency range of variable frequency oscillator 534, which say is 2.5–5 mcs., consider now the loop arrangement for control coverage of the various bands of interest which in the illustrated example become say bands 2, 3, and 5 for 2–40 mcs. wherein respectively ranges 5–10 mcs., 10–20 and 20–40 are tunable.

In this functional operation, the frequency coverage is secured via a successively selected multiplication process of the highly stable VFO 534 output, and maintenance of the stabilizing feedback loop, when any of the frequency multipliers 537, 538, 539 are switched in to allow coverage of other band ranges of the high frequency region, must be made. For example, where the frequency doubler 537 is actuated to say change the tuning head unit 512 to generate the output frequencies covering the second band, 5.0–10 mcs., the D.C. voltage output being applied to the voltage sensitive variable reactance 633 is accordingly unchanged since the basic variable frequency oscillator 534 range does not change. However, its frequency drift and error is multiplied by the factor two.

Similarly such a sequence occurs wherein band selection is made to positions where respectively multiplication factors of $n=4$ and 8 are used. It will become evident from the following description and example explanation that with the ganged selector switch 536 band changing operation, frequency multipliers of ($\times n$) factor inserted in the forward signal path of the basic VFO output are accompanied by frequency dividers in the return feedback path, that divide by the factor $n$ the multiplied frequency error possessed by the mean IF frequency signal being error compared. Thereby, the subsequent automatic carrier positioning control sensitivity is sustained within the allotted bandwidth for the basic VFO range frequency stabilization since the multiplied frequency error or ($n\Delta e$) is cancelled by the division process of ($1/n$).

Referring now to the previously mentioned other path that the output of NB IF amplifier 525 takes to the input of mixer 542, the frequency value of the output was expressed as 500 kc.p.s. ($\pm$) $n\Delta e$, where $n=1, 2, 4, 8$. For $n=1$, the output signal was described as taking a direct path to limiter 527 through position 1 of band selector switch 526. The positions 2, 3 and 4 of this switch are without connections. The signal path from the output of mixer 542 to the limiter 527 is completed for band selector switch positions of 2, 3 and 4. Considering in detail band selection 2, then the other signal applied to mixer 542 to heterodyne therein with input signal 500 kc.p.s. ($\pm$) $2\Delta e$ is obtained from the switch selectable tuned output of tuned RF amplifier 541. This signal is selected from the harmonics of 500 kc.p.s. square wave output of odd harmonic generator 540. As noted earlier, one signal path of the output of IF carrier crystal oscillator 530 is being applied to the input of odd harmonic generator 540, and the IF carrier frequency of 500 kc.p.s. and odd harmonic thereof appear in the square waveform signal developed at the harmonic generator output, or 500 kc.p.s., 1.5 mcs., 2.5 mcs., etc. or 500 kc. ($n+1$) where $n=0, 2, 4, 6, 8$ etc. and represents the multiplication factor $n$ of the tuning head unit 512.

The harmonic output is applied to tuned RF amplifier 541 which has in its output a switch selectable number of sharply tuned circuits whose center frequency values are located at values of 500 kc.p.s. ($n+1$). The appropriate switching is made by selector switch 536 which is ganged with the other switches in accordance with the chosen $n$ factors. In this example $n=2$, the amplifier is tuned at 500 kc.p.s. ($2+1$) or 1.5 mcs., and this 1.5 mcs. signal mixes with the extracted IF mean frequency signal of 500 kc.p.s. $\pm 2\Delta e$. The mixer 542 output is fed to tuned RF amplifier 543, which is ganged with and of similar configuration to tuned RF amplifier 541 except amplifier 543 has its switch selectable range of tank circuits sharply tuned to the difference frequency product from the mixer output, that is, at values of ($n$ 500 kc.p.s.). Thus for band selector position 2, tuned RF amplifier 543 is switched via switch section to selectively pass in the narrow frequency region about 1 mcs. The sum frequency product along with the two applied signals appearing at the mixer output are readily suppressed by amplifier 543 selectivity characteristics. The output of amplifier 543, in general expressed as [$n$ 500 kc. ($\pm$) $n\Delta e$] and as [1 mcs. ($\pm$) $2\Delta e$] for $n=2$, is fed to the wiper of band selector switch section 544, which for $n=2$ is located in position 2.

Position 2 feeds the signal to frequency divider 545, which divides the applied signal by a factor of 2. The divider 545 output thereby becomes of frequency [500 kc.p.s. ($\pm$) $\Delta e$] which is thereupon applied to limiter 527. The output of limiter 527 is thereafter processed in similar manner as was described earlier for the fundamental range, since the multiplied frequency difference has returned to its initial value by equal factor division.

Dividers 545, 546 and 547 may be of the regenerative frequency divider type. Divider 547 halves a 4 mcs. input for $n=8$ at position 4 to produce a 2 mcs. signal at its output. Divider 546 halves either this 2 mcs. signal or the 2 mcs. input at position 3 for $n=4$, and supplies its 1 mcs. output signal to divider 545. Accordingly, 2:1 divider 545 always has an output frequency signal of 500 kc.p.s. $\pm\Delta e$ for the band selector switch section SWIB 544 positions of 2, 3 and 4 where $n$ represents 2, 4 and 8 respectively.

With automatic carrier positioning no further R.F. tuning operation is involved in securing the subsequent wave analysis measurements of the various spectrum components of the R.F. response signal being translated. Hence, it is implemented by way of this overall method and invention apparatus precise and stable audio frequency tuning is conveniently provided for the specific desired frequency component selecting and filtering at the audio range in a switchable sequential manner.

The two tone type response in the given example has been translated from the high frequency region of 2–40 mcs. However, this test is obviously not to be frequency limited, wherein by suitable design, two simultaneous R.F. signals may be generated at frequencies which may be in the VHF or UHF band with a number of selectable tone pairs. Contra-wise, IF two tone test, may be made for testing of IF–RF systems as explained later on with respect to FIG. 8. Visa-versa, RF to IF systems test may also be made.

OUTPUT MEASURING SECTION 300
(FIGURE 6)

As is well known, present state of the art output measuring equipments are, in general, limitations on the intermodulation distortion measurement of the response output of the unit under test for such RF test signals output as herein experienced since the required signal resolution would have to be obtained at extremely low audio frequencies requiring highly stable multiple heterodyning means for the down frequency translation and so coverage of a rather extended frequency range is difficult to achieve.

Hence, as a preferred and novel method for the direct solution of such measurement problems, the output measurement section 300 of the disclosed intermodulation wave analysis test system result from the judicious implementation of the previously described audio operating signal generation section 400 output as operating and tuning signals in the activation of the unique selecive filter arrangement shown in FIG. 6 and functioning in accordance with the following description for any particular IF carrier frequency value.

Details of the output measuring circuitry as illustrated in FIG. 6 mainly concerns an active selective filter unit 150 having a pair of channels 151 and 152, combining stage 170, band pass filter combination 171, 172 and voltmeter means 173, 174. As described earlier, the RF two tone type test signal after passing through unit under test 200 and containing, where intermodulation distortion is sufficient, these frequencies as shown by well known spectrum sketch 153, is applied to variable frequency stabilized translator 500 and the RF to IF converted output is fed to IF attenuator 515. This attenuator aids to enable measurement of low level or weak signal components in the presence of large amplitude frequency component terms and the attenuator output is simultaneously applied to the inputs of the IF balance modulators 155 and 156 of channels 151 and 152 respectively. The generated first local oscillator signal (i.e. $f_{lo}1=f_{IF}$) is applied to each of the balanced modulators 155, 156 via their respective IF phase shift networks 157 and 158. In order to simplify the subsequent description, it is assumed that IF center frequency stabilization, as previously described in the ACP operation, has occurred; that the generated local carrier signal applied is $f_{IF}$ and main concern is given to $M=1$ term selection.

The IF phase shifter 157 of channel 151 (or I) applies a 45° lead, while IF phase shifter 158 of channel 152 (or II) applies a 45° lag. The carrier signal inputs to both modulators are of equal suitable levels, set to be much greater than the level of the IF input test response signal to the modulators such that the modulator outputs are thereby linearly proportional to the amplitude of the response signal inputs. However, the phase relationship between the IF carrier inputs results in their being 90° out of phase with one another or in quadrature.

The outputs of the pair of like IF balanced modulators 155, 156, having quadratic carrier inputs applied whose IF frequency value positions it at the incoming test spectrums center or mid-frequency location, by way of the ACP technique of FIG. 5, results mainly in double sideband modulator outputs. The resulting lower sideband output consists of the difference frequency products which represent the original incoming signal information down translated into the audio region and now located about the zero (DC) frequency. The resulting upper sideband output consists of the sum frequency products which represent the incoming signal information translated and centered about twice the IF carrier (or the mean) frequency value. For the IF spectrum input, the modulator output upper sideband components are beyond the bandpass region of the channels and are thereby readily attenuated.

Consider again the typical IF two tone intermodulation spectrum 153 shown and consisting of a pair of fundamental tones, and pairs (upper and lower) of their 3rd $[(2f_2-f_1), (2f_1-f_2)]$ and of their 5th $[(3f_2-2f_1), (3f_1-2f_2)]$ odd order difference frequency terms. These signal components, equally spacing themselves at $\Delta F$ c.p.s. intervals in the frequency distribution, with respect to the mean or mid-frequency location of the spectrum distribution have components respectively positioned at intervals $(\pm \Delta F/2)$, $(\pm 3\Delta F/2)$, $(\pm 5\Delta F/2)$, etc. The subsequent spectrum translation to about zero frequency results in lower sideband difference frequency terms of differing phase superimposed audio frequency signals of $(\pm M\Delta F/2)$; with M factors of 1, 3, 5 respectively. Terms designated negative represent main tone and intermodulation product components located in the incoming IF spectrum at frequencies less than the distributions mid-frequency value of $f_{IF}$.

Since each of the first pair modulators together need only produce therebetween a 90 degree phase shift, networks of opposite sign are employed. IF phase shift network 157 being of resistance-inductance type supplies a positive or leading 45 degree phase change with IF phase shift network 158 of resistance-capacitance type providing a negative or lagging 45 degree phase change.

The outputs of the modulators 155, 156 are applied at one time to their respective variable high pass filters 159 and 160, and to one terminal 161a, b on different wafer sections 162a, 162b of double throw mode switch 163. The other terminals 163a, b receive the output of high pass filter 159, 160 reespectively. The switch 163 serves to bypass, in what is designated band pass mode 2, the high pass filters.

Variable low pass filters 164, 164 are of identical cut-off frequencies, and being switch coupled are ganged with like cut-off frequencies selectable. The high pass filter 159, 160 likewise have cutoff frequencies that are identical and selectively switchable. As observed from mode 1, when the high pass filters are not by-passed, they connect in series cascade with their respective low pass filters and thereby establish an identical selective pass region of variable frequency between the two modulators of each channel. In some design applications, these filters may be supplanted by audio frequency tunable, highly selective amplifiers that have a constant gain with frequency characteristic over the range of tuning.

Low pass filters 164, 165 and high pass filters 159 and 160 are identical in construction. These filters are of active filter configurations having flat frequency response over their pass region and sharply attenuate all frequency components below the cut-off frequency for the high pass circuits and above the cut-off frequency for the low pass units. Thereby, in cascade arrangement, the pass region between the two cut-off frequencies constitutes a sharp, flat type selective region when switch 163 is in mode 1. Mode 1, which may be designated band stop mode for the herein described filtering action, functions in producing the audio selective intermodulation distortion filtering process by readily rejecting the other audio frequency components that are equally spaced and located about the selected audio term of interest. The combined filter action is pre-set and tunable in a switchable manner so that mode 1, in sequence operation, passes the fundamental term $\Delta F/2$ for $M=1$, and the selected third $(M=3)$ and fifth $(M=5)$ audio terms of $M\Delta F/2$ in the modulator outputs. This audio tuning is accomplished through the appropriate switch selection of filter 159, 160, 164 and 165 cutoff frequencies to be approximately at, and thereby pass without attenuation, the modulator audio frequency output signals corresponding to the specific M factor terms under measurement. Set in the other position, mode 2, switch 163, only the fundamental tone measurement is made and the low pass filters 159 and 160 are preset selectively to pass the lowest audio frequency signal at the modulator outputs of $\Delta F/2$ and readily reject all other higher audio frequency terms.

A typical example of a suitable low pass filter configuration is illustrated by the block of filter 164 wherein only two stages are shown but additional like stages may be added thereto in cascade. An active R-C filter circuit is used whose cut-off frequency may be varied by interchanging of the proper value resistors and capacitors in conventional ganged switch manner. A positive feed amplifier circuit follows the R-C network and between the two there exists a negative feedback loop.

Clearly, with such additional series stages, say four, one can produce an attenuation rate exceeding 72 db per octave. Similar active configurations using a R-C network circuit likewise are conventionally available and perform suitably as switch selectable high pass filters.

It is to be understood that the division of the illustrated embodiment of FIG. 6 into two operating modes is necessary since the mode 2 action allows for coverage of measurement situations necessitating the most severe selectivity for the lowest audio term within practical limitations. This feature thereby makes further use of the activated filter arrangement as a variable bandpass filter only, by way of operating mode 2, and it is considered aiding in the overall operation of this inverted system. For example, as described later on in this specification, general RF variable filtering may be achieved in a simulated manner.

Now the selected audio frequency outputs of the low-pass filters 164 and 165 are in quadrature and respectively become the modulating signal inputs to double balanced modulators 166 and 167. The carrier inputs for these modulators are obtained from the audio operating signal section 400 of FIG. 4 which is generating signal (C) suplpied as the common audio carrier signal $(M\Delta F/2)$ in the audio tuning operation of the filterin gprocess.

The common audio carrier (or local oscillator) signal of $M\Delta F/2$ undergoes a plus 45 degree phase shift due to passing through audio phase shift stage 168 in its path to the carrier input of double balanced modulator 166 of channel 1; and experiences a minus 45 degree phase shift upon passing through audio phase shift stage 169 in its application as the carrier input to double balanced modulator 167 of channel II. The carrier input signals at the modulators are then in quadrature with respect to each other, that is, 90° out of phase. Here for convenience, consider operation in mode 2, where the down frequency translated main tone frequencies of $f_1$ and $f_2$ only are passed through low pass filter 164 and 165 as difference frequency products $\Delta F/2$ c.p.s. In accordance with the audio frequency tuning feature, the audio frequency operating signal section 400 is selectively tuned and switched to provide a common carrier signal for the pair of double balanced modulators 166, 167 that is of identical frequency value as the input modulating signals to these modulators. Hence, M is set equal to 1, where the fundamental frequency is selected and the switch selected common carrier signal frequency is $\Delta F/2$. Likewise, where say mode 1 is employed and a measurement is made for $M=1$, thereafter M is set for modulation with the odd order terms selectively passed by the high-pass low-pass filter combination within the channels. Therefore, it can be seen that with passage of $\Delta F/2$ terms, the switch selected oscillator frequency from section 400 is $\Delta F/2$; upon filter tuning for passage of 3rd IM term or $M=3$, the supplied selected carrier frequency becomes $3\Delta F/2$, and for the within channel selection of the 5th IM terms, selector switch 411 of section 400 is set to $M=5$ and provides $5\Delta F/2$ c.p.s. carrier signal frequency. Of note is the fact that the difference in frequency therebetween is $M\Delta F$ c.p.s. or twice the fundamental audio frequency of $\Delta F/2$, and that the third IM audio term lies one and one half octaves above cut-off $\Delta F/2$ of the mode 2 setting of the filters. Similarly, with respect to the mode 1 setting of the high pass filter, it can be shown that with respect to a cut-off at $3\Delta F/2$, the $\Delta F/2$, the term is one and two-thirds octave below. In selecting the 3rd IM term, the 5th IM term is attenuated by two thirds octave attenuation rate; while for selection of the 5th term, the 3rd term is then attenuated at four-fifths of the octave rate.

In practical filters, the cut-off frequency is conventionally referenced to the 3 db point, and accordingly the actual cut-off frequencies are slightly above the signal being passed in the case of the low pass filters and below in the case of the high pass filters. As example, for the low pass filter with passage of signal $\Delta F/2$ at 100 c.p.s. the actual cut-off frequency would be 108 c.p.s. and the octave at 216 c.p.s. A similar situation exists with respect to the actual cut-off frequency locations in the high pass case. Likewise in practice, insertion loss due to the similar filters between the modulators can be neglected since the losses are uniform and only relative type amplitude measurements between the main component used as reference and the IM terms are normally required.

In general the audio phase shift network 168 causing a phase lead of 45°, and phase shift network 169, giving a 45° lag, may be of the active type having a band response extending flat and wide say 50 to 5500 c.p.s., but where a greater frequency range is encountered, a suitable number of passive phase shifting networks each covering a narrow band-width of say 2000 c.p.s. can be suitably employed by selecting them individually through known mechanical ganged means. These passive networks can be selected knowing the $\Delta F/2$ separation indication supplied by the frequency dial of turnable audio oscillator 410 (FIG. 4) and the range of the $M\Delta F/2$ terms. The double balanced modulators 166 and 167 which receive inputs from the audio phase shift networks 168 and 169 respectively, are similar product modulators that provide a resultant output which is proportional to the amplitude product of its two input signals. They further serve to eliminate the input signal from appearing at the output as well as being balanced to suppress the development of the carrier in the output. The two like modulators may, for example, be of the diode ring type or a Hall generator device wherein a high degree of carrier and modulating signal suppression is achieved with little need for any adjustment. With supplied constant and relatively large amplitude carrier signal inputs to the modulators, the modulator outputs are linearly related to the amplitude of the modulating signal inputs. Although not illustrated, isolating cathode follower stages may be inserted before the inputs to the phase shifters, thus insuring separate transmission paths between the channels. It is to be noted, as is common with product modulator operations, the resultant sideband components in the output are separate from one another by twice the input modulating frequency and are spaced about the suppressed carrier frequency by an amount equal to the modulating frequency, thus representing a double sideband spectrum distribution.

The resultant output of modulator 166 for $M=1$ comprises the following $[(+\Delta F/2)-(\Delta F/2)]$ and $$[(+\Delta F/2)+(\Delta F/2)]$$

for one of the superimposed audio modulating signals, while for the other $(-\Delta F/2)$, we have $$[(-\Delta F/2)-(\Delta F/2)]$$

and $[(-\Delta F/2)+(\Delta F/2)]$. Effectively these terms reduce to two spectrum locations, where the lower sideband or difference frequency products are at zero frequency or D.C. while the upper sideband or sum components become $(-\Delta F)$ and $(+\Delta F)$ signals.

Similarly, the resultant output of double balanced modulator 167 constitutes DC lower sideband components and component signals of $(-\Delta F)$ and $(+\Delta F)$. Now due to the second quadrature relation that has been employed and the selection of first the difference then the sum product in the signal process, the audio output voltages of the double balanced modulators 166 and 167 have experienced a total of 180 degrees phase reversal with respect to each other, such that the undesired component signals of $(-\Delta F)$ are 180 degrees out of phase while the desired terms of $(+\Delta F)$ are in phase.

Summation of these signals results in the phase cancellation of the undesired $(-\Delta F)$ components and the adding together of the two $(+\Delta F)$ component terms from Channels I and II. D.C. component terms are also obtained. However, it is to be noted that the use of capacitive coupling of the modulator outputs to the linear combining network 170 would eliminate the DC terms from the summation process. The sideband outputs are added in linear combining network 170. This audio summation circuit may for example be of resistive components or the audio transformer type, various configurations of which are known to the art. This selective modulation process for double balanced modulators 166 and 167, where the modulating audio signal and the carrier audio signal are of the identical frequency value, is directly insured by the precise frequency governing action derived by having the common audio local oscillator signals generated and supplied from audio frequency operating signal section 400 being set equal at all times to one-half the audio frequency separation between the tones, or odd multiples thereof as required. This identical frequency equating property for the output measuring means allows for more stringent cut-off characteristics in the subsequent filtering and allows for the exact establishment of the DC (or zero frequency) lower sideband component in the final modulator outputs. Hence, the IF two tone signal input spectrum to the selective filter unit 150 results in but a single audio tone output. The high pass filter 171, which is likewise an active filter configuration of variable cut-off frequency similar to high pass filters 159 and 160, has its cut-off frequency set to accept and pass the in phase sum frequency term $(M\Delta F)$ from the output of the linear combining network 170, and sharply attenuate any lower frequency values. This high pass filter thus serves to further attenuate the already highly suppressed carrier signal of $M\Delta F/2$ existing in the outputs of the double balanced modulators 166 and 167, and also eliminate the DC component term and all other undesired signals below its cut-off frequency. The output of high pass filter 171 is then applied to low pass filter 172 having a fixed cut-off frequency value greater than twice the maximum frequency value of $M\Delta F/2$ carrier frequency that it to be supplied by the test system.

As the carrier and modulating signals in the double balanced modulator outputs are already well suppressed, the attenuation rate of the High Pass Filter 171 need only be sufficient to insure the further attenuation at this frequency value to suitably suppress any such signal beyond the dynamic range of the herein-described apparatus.

In a specific design, the switch selection of the cut-off frequencies of filter 171 may be suitably ganged, though not so shown, to be made in correspondence with the selections of the within channel filters and mode switch setting. Greater dynamic range is secured by having the attenuation rate set to further attenuate undesired components $\Delta F$ away from cut-off value when the 3rd IM term is being measured. The low pass filter 172 serves to produce a bandpass region that insures rejection of undesired components and its signal output constitutes a pure audio frequency signal that represents the translated and selectively filtered RF frequency term of interest; that is $f_1$ (or $f_2$) for the band pass mode 2 of operation in general, and for the band stop mode 1 for intermodulation measurement and thereafter the 3rd or the 5th IM frequency term of the RF response in accordance with the band stop mode selection. It is to be recognized that in design applications wherein a high degree of carrier and signal suppression is achieved from the double balanced modulators, the capacitive coupling of the modulator output to the low pass filter 172 need only be required to eliminate the lower sideband DC component term and can serve to supplant the high pass filter 171 requirement in such a case.

Where a distortion amplitude measurement of greater accuracy is desired, the low pass filter 172 can be also of variable cut-off frequency and be set to sharply attenuate slightly beyond the cut-off frequency of the high pass filter 171 thus insuring the suppression of any 3rd harmonic of the second local oscillator frequency that may develop at either modulator output.

The output of low pass filter 172 is applied to rectifier and amplifier stage 173 for subsequent signal rectification and amplitude measurement of its output by volt meter indicator 174. The filtered signal, after amplification to a suitable level, is rectified by the full wave rectifier bridge 173. The resultant rectified ouput is a DC voltage proportional to the filtered input signal's R.M.S. value and is accordingly indicated by meter 174. A DC output for use with external recording devices to obtain graphical plotting can readily be obtained from the meter circuit. Upon subsequent selection and measurement of the main RF tone frequency term as $\Delta F$ and thereafter the 3rd and the 5th RF intermodulation terms as ($3\Delta F$) and ($5\Delta F$) respectively, and in like manner other IM terms of interest as described in detail in the above paragraphs, the successive meter (174) readings thereby obtained become the comparative proportional indications.

EXAMPLE OF OPERATION (FIG. 7)

In the operation of the newly introduce automatic carrier positioning the functional action occurring in the circuits arrangements of FIGS. 3 to 6 may be best described by way of referencing such operation with the aid of the typical signal waveform representations illustrated in FIG. 7. For simplicity, it is first assumed that the unit under test 200 is linear and thereafter the effect of the IM distortion content is discussed.

FIG. 7 is a typical graphical representation of the instantaneous relationship with respect to time of two equal amplitude sinewaves of different frequency value. Here the solid line wave being of frequency value $f_1$ and the broken line $f_2$, with the frequency separation $\Delta F = f_2 - f_1$. The addition of the instantaneous amplitudes of these two sine waves results in the instantaneous sinusoidal variation represented in waveform ($a$) wherein the tips of the resultant voltage wave trace out the symmetrical envelope shape about the zero axis. Herein only a few cycles of each wave within the envelope are shown sketched, while in the actual case, numerous cycles exist such that a solid enclosed envelope is usually observed on an oscilloscope. Of particular note as shown sketched, the instantaneous amplitude plot of the combined two tones results in a 180° phase reversal occurring at the point where their instantaneous amplitudes find themselves 180 degrees out of phase and this occurs at a $1/\Delta F$ rate. As explained earlier, this RF waveform 7a is in essence analogous to that of a double sideband, suppressed carrier AM wave that is modulated by a single audio frequency signal of $\Delta F/2$ c.p.s. value. Then the wave with the carrier suppressed has an apparent phase which reverses itself every time the modulating signal $\Delta F/2$ c.p.s. goes through zero, that is, twice per cycle hence at a $1/\Delta F$ rate.

This feature and analogous characteristic of these waveforms is particularly used in implementing the apparatus of this invention.

While waveforms ($a$) and ($b$) have their shape affected when for example the resultant wave ($a$) is passed through an amplifier possessing a degree of non-linearity, and intermodulation distortion is introduced, the phase modulation component waveform of ($c$) remains unaltered. The intermodulation distortion thereby effects amplitude variation and the envelope's amplitude shape. This particular characteristic becomes further clear when it is realized that the limiter itself is a non-linear device functioning to remove amplitude variations from the distorted waveform applied to it, and further amplitude variations would not change the constant amplitude phase modulated wave output obtained. Examples of distorted waves exhibiting their variations in the envelope of the wave are also given, illustrated by way of sketches (O) to (A). Finally, one further observes from the resultant mathematical expression for the case of the two-tone test signal $C_s = \cos \omega_1 t + \cos \omega_2 t$ passing through amplifier tube of well known characteristic $$i_b = I_{B_0} + K_1 e_g + K_2 e_g^2 + \ldots$$

that all intermodulation frequency components of each frequency product developed in the tube plate current are either exactly in phase or 180 degrees out of phase.

The translated IF signal applied to amplitude limiter 516 is the well-known RF two tone waveform of $\Delta F$ frequency separation ($a$) that possesses amplitude and phase modulation components. Envelope detection of the amplitude modulation components results in the typical waveshape ($b$). The phase modulated waveform resulting from the action of limiter 516 is of constant amplitude as illustrated by waveform ($c$). Waveform ($d$) shows the RF phase modulation component of the two tone equal amplitude signal reference to a frequency exactly midway between the two tone frequencies and of value $(f_1+f_2)/2 = f_{\text{mean}}$, as is well known and given in "Single Sideband Principles and Circuits" E. Pappenfus, etc. p. 180, McGraw-Hill Book Company published 1964.

Sinusoidal signal waveform ($e$) of audio frequency value $(\Delta F)/2$ is derived from the tunable audio oscillator 410 of FIG. 4 that functions in the $\Delta F$ phase locking of the two tone RF generation and in the generation of the trigger signal. The half-sine waveform ($f$) is the positive half inverted full wave rectified waveform of $(\Delta F)/2$ signal ($e$). For simplicity in the graphical illustration of representative waveform, the envelope delay is assumed to be zero and time delay compensation of waveform ($f$) is not shown. The pulse waveform $g$ obtained from the switch trigger stage 421 of FIG. 4 becomes the actual more distinct trigger signal for the subsequent phase reversing action that takes place. In response to waveform ($g$), multivibrator driver 522 of FIG. 6 produces dual out-of-phase square output waveform ($h$) and ($i$), which have a pulse repetition rate of $(\Delta F)/2$ for the alternation of switch 521 positions of A and B respectively.

At position A, waveform ($j$), which is the same as waveform ($c$), is applied and results from the zero path of phase splitter 520 of FIG. 5.

At position B, waveform ($k$) appears as a reversal of waveform ($j$) resulting from the 180 degree path of phase splitter 520. Accordingly, at the common C output of switch 521, waveform (*l*) appears resulting from switch control by waveform (*h*); and waveform (*m*) develops due to switch control action by way of waveform (*i*). The combined waveform, resulting at the output of controlled switch 521 is representative of a CW signal waveform as (*n*) and, with the phase modulation removed, is of mean frequency value, $f_{meen} = f_1 + f_2/2$.

Now in the actual operating case, with the two frequency test signal passing through a non-linear unit under test 200, the distortion products that develop cause the shape of the RF response envelope to be different from the pure two tone signal.

The waveform (*a*) is the two tone waveform without distortion and while the deviation from this ideal shape would be exhibited by like change of waveform (*b*), the phase modulated waveform (*c*) is still substantially maintained and subsequently useful in the demodulation process that follows.

By way of example, the following waveform distortion, as readily observed on an oscilloscope, and in practice may be the usual conditions of the translated IF two tone response signal to be amplitude limited.

Waveform (*o*) is the ideal waveform obtained for the pure linear case. Waveform (*p*) represents excessive grid bias and waveform (*q*) results from excessive driving voltage or improper loading of a unit under test, which may be a typical linear RF amplifier. The distorted two tone waveshape of (*r*) is typical of that experienced due to combination effects of the (*p*) and (*q*) cases. The final two representations (*s*) and (*t*) are normally obtained in say the IF–RF translation stages of transmission systems testing where waveform (*s*) is indicative of the result due to local oscillator signal leakage and distorted waveform (*t*) is generally observed to be caused by harmonic distortion components developed within the translating sections of a wide band system under test.

The pure two tone wave of course has its envelope amplitude going to zero at regular intervals. Where small amounts of intermodulation distortion accompanies a two tone wave, the amplitude is generally observed to substantially go to zero, and little difference results from the subsequent limiting and phase reversing action as described herein. Even in the relatively worse case as illustrated by waveform (*t*), suitable performance of the automatic carrier positioning technique is achievable.

It can thus be noted that in deriving the switching signal indirectly from a full wave rectified AC signal, a more precise determination of the switching point is achieved than would be possible from the direct trigger use of the amplitude demodulator waveform of the two tone RF wave output of the unit under test, which is, in practice, accompanied by the IM distortion terms, and hence tends to at times be indistinct.

WIDE RANGE, SELF-OPERATIVE SUPER-HETERODYNE METHOD (FIG. 8)

Having described in detail the operation of circuits arrangements given in FIGS. 3–6, examine now the detailed circuits arrangement of FIG. 8. The block diagram of the illustrated practical alternate embodiment of the portion of the test system represents the method and apparatus of the invention wherein relatively drift-free wide range frequency coverage with stabilized super-heterodyne translation is made; and further wherein the automatic carrier positioning is a self-maintained operation, obtained by securing the necessary operating signals from the two tone type spectrum under investigation.

To demonstrate the multiple frequency wide range test capability, which is one of the stated objectives of the overall method, two tone test signal source 100 may be any typical two tone equal amplitude signal generator of high stability that performs within the input frequency operation range of the system under test 200. By way of one suitable example, source 100 may be a conventional intermediate frequency (IF) two tone generator applying a two tone test signal to the IF signal input of say the IF-RF translation stages of a transmission system, operating in the S-band spectrum, and terminated into a dummy load. The resulting system response output becomes the input spectrum content to the measuring apparatus for analysis. In the low frequency IF region, sufficiently stable oscillators normally exist such that difference frequency separation between the tones may be substantially maintained constant without the need of the phase locking arrangement of FIG. 3.

Accordingly, the input spectrum, which in the given case is say a two tone plus IM distortion component waveform in the microwave region, after suitable attenuation by variable input attenuator 801, is applied to wide band 1st mixer 802. The local oscillator signal for mixer 802 is supplied by VFO 803, which may be any suitable tunable oscillator at this frequency region that likewise possesses a voltage controllable tuning element. By way of example, VFO 803 may be a conventional backward wave oscillator (BWO), which is then tuned to be at say 30 mcs. above the mean frequency, $f_1$, value of the input spectrum. Thereby, the input spectrum is translated to about the difference frequency value of 30 mcs. at the output of mixer 802, which is the first IF value.

Conventional backward wave oscillators are electrically tunable for an octave (2:1) in the S-band. The voltage controllable tuning is obtained from a controller which, as is conventional in the art, controls the helix voltage of the BWO used as VFO 803 and represents the voltage controlled tuning element 826.

The mixer 802 output is applied to first IF amplifier 804 which has its design center frequency at 30 mcs. and has a bandwidth of say 100 kc.p.s 1st 1M amp. 804 passes the difference frequency signal of 30 mcs. and rejects all other mixer 802 output signals. The output of 1st IF amp. 804 is then applied to 2nd mixer 805 and a portion of the 30 mcs. IF signal is likewise supplied to the input of 1st loop mixer 806. 2nd mixer 805 and 1st loop mixer 806 have a common fixed crystal stabilized local oscillator signal, supplied by crystal controlled local oscillator 807. Crystal oscillator 807 has its frequency determined by 19.3 mcs. crystal unit 808 which thereby becomes the frequency value applied to the drift-free heterodyne operation. This manner of sharing the same local oscillator 807 eliminates any frequency drift that may exist in the signal path due to this oscillator.

The 2nd IF amplifier 809 in the output of mixer 805 has its design center frequency value at 10.7 mcs. with a bandwidth of say 50 kc.p.s. Accordingly, 2nd IF amplifier 809 passes the difference frequency output of 2nd mixer 805 and rejects all other output signals. The incoming spectrum under examination now has its means center frequency value further translated to the 2nd IF of 10.7 mcs., which, after suitable attenuation by a variable IF attenuator, is then applied as the input spectrum to the polymodulation selective filtering circuit arrangement illustrated in FIG. 6 and was described in the prior paragraphs above.

The output of the 1st loop mixer 806 is applied to 1st loop IF amplifier 810 which also has its design center frequency value at 10.7 mcs. and may be say of bandwidth 100 kc.p.s. 1st loop IF amplifier 810 likewise selects and passes the difference frequency output of 1st loop mixer 806 while rejecting all other signals.

The output of 1st loop IF amplifier 810 is then applied over two paths. One path leads to amplitude detector 811 and the other path going to the input of variable time delay network 812. This IF output, after suitable delay which compensates for the time delay involved in the generation of the switch triggering signal for the phase reversing action. This IF output is applied to amplitude limiter 813 which removes the amplitude variations of the input signal and produces a phase modulated wave at its output. Considering first the IF output to amplitude detector 811, the envelope of the two tone type IF signal is detected thus giving the amplitude modulation component output with the resulting waveform approaching that of the well known full wave rectified AC signal waveshape and having a repetition equal to the audio difference frequency value of the two tone signal, or ΔF c.p.s., as shown.

This detected signal, by itself, is not of suitable use in direct application as a trigger switching signal for the subsequent phase reversing switch action since the stabilization effect of the ACP system, as achieved in accordance with the description and illustration concerning the typical embodiment of FIG. 5, requires repeated precisely timed switching; whereas the detected envelope possessing some distortion tends to be erratic at the triggering positions.

Therefore, the trigger switching signal is suitably derived from the detected waveform in the following manner which likewise functions to generate the required audio frequency operating signals for use in the audio tuning of the output measuring section of FIG. 6. The detector 811, which may also be a square law detector, has its output applied to variable cutoff low pass filter 814, whose cutoff frequency is adjusted to be slightly greater than ΔF c.p.s. The resultant output of low pass filter 814 is then ΔF c.p.s., which is the fundamental frequency of the envelope waveform with all the other harmonics being beyond the cutoff frequency of the filter and readily attenuated. The single LPF 814 tuning may be obtained by suitable switching of stage 173, 174 A.C. voltmeter of FIG. 6 to monitor the filter 814 fundamental output. The single unattenuated frequency signal output ΔF c.p.s. of the filter 814 is fed to input of conventional pulse type frequency divider 815, which has Schmidt trigger input circuit. Divider 815, of 2:1 ratio, halves the sinusoidal input of ΔF c.p.s. to produce a square wave pulse output of $(\Delta F)/2$ c.p.s. The pulse output, consisting of fundamental frequency $(\Delta F)/2$ and odd harmonic factors thereof and may be expressed as $(M\Delta F)/2$ where $M=1, 3, 5$, etc., is applied over two paths. By one path it becomes the input signal to variable audio frequency selective amplifier 816, and by way of the other path it is applied to variable low pass filter 817. Selective amplifier 816, which may be a conventional cascaded high gain amplifier with a sharply tunable R-C null network in the overall feedback path, is tuned to pass and amplify the particular $(M\Delta F)/2$ component of interest. Thereupon the selected $(M\Delta F)/2$ component output of amplifier 816 is applied to function as the common audio frequency carrier signal in accordance with the active selective filter arrangement of FIG. 6. The calibrated frequency dial of the variable audio frequency selective amplifier 816 serves to give a direct indication of the value of $(\Delta F)/2$ in the tuning to its first response from zero frequency and is thereafter used in the selection of $3\Delta F/2$ and $5\Delta F/2$, and also in the subsequent setting of the active low pass and high pass filters of the filter arrangement of FIG. 6 in accordance with the invention.

Returning to the other path of divider 815 output, variable low pass filter 817, having its cutoff frequency set to be slightly greater than ΔF/2 by way of its coupling to similar type filter 814, passes only the fundamental frequency of ΔF/2 of the input signal and readily rejects all harmonics thereof.

The sinusoidal output signal of ΔF/2 c.p.s. becomes the input signal to limiting amplifier 818, which thereupon acts as stage replacement of multivibrator driver 522 of FIG. 5 of the phase reversal switch and full wave rectifier 415-switch trigger stage 421 of FIG. 4. Limiting amplifier 818 is essentially a symmetrical sine wave clipping circuit which converts the sine wave into a square wave with identical zero crossing.

The resultant output of limiting amplifier 818 is then a square wave of repetition frequency ΔF/2, that is, having a period of 2/ΔF. This square wave signal is supplied to the phase splitting driver of diode gate switch and phase split driver stage 820.

The resulting switching operation occurs in similar manner as was described for phase splitter 523 and diode gate switch 521 of FIG. 5 for the time compensated phase modulated IF output waveform from amplitude limiter 813, this PM signal is applied to phase splitter 819. In like manner as described for FIG. 5, the phase splitter 819 output consists of zero degree signal path to contact A of diode gate switch and phase split driver stage 820; and 180 degree signal path to contact B of stage 820. With limiting amplifier 818 supplying the operating trigger signal at a repetition rate ΔF/2 c.p.s. to control the phase split driver of diode gate switch and driver stage 820, operation to bring about the phase reversing switch action occurs as described in detail in accordance with the similar operation of FIG. 5. Switch stage 820 produces the resultant output signal at 820a that is of frequency value equal to the carrier frequency value of the phase modulated wave applied to the input of phase splitter 819.

With the approximately tuning of BWO 803 to 30 mcs. above the center frequency of the incoming spectrum under analysis, the frequency of the output is approximately 10.7 mcs. This signal is then applied to narrow band 2nd loop IF amplifier 821 which has its design center frequency at 10.7 mcs. The output of 2nd loop IF amplifier 821, which say may be of 50 kc.p.s. bandwidth is applied to amplitude limiter 822 where amplitude variations of the continuous frequency signal $f_c$ are removed.

Amplitude limiter 822 applies its output over two separate paths. One path to the input of dual cathode follower 823 and the other path to the input of crystal frequency discriminator 824. Dual cathode follower 823 is a conventional parallel arrangement of separate output cathode followers being driven from a common input. These cathode followers 823A and 823B serve to isolate the channels I and II of the output measuring section from IF local oscillator interaction. Accordingly the output of cathode follower 823A is applied as the IF local oscillator signal frequency $f_{loif}$ of 10.7 mc.p.s. to the IF phase shift network of channel I while cathode follower 823B supplies its output to the 10.7 mcs. IF local oscillator signal, $f_{loif}$, to the IF phase shift network of channel II (see FIG. 6).

Further operation along these paths has been readily discussed in detail in the description covering the output measuring section in accordance with the drawing of FIG. 6.

Returning to limiter 822 output, consider now the other path to discriminator 824 input, where the closing of the automatic control loop system will be shown to give a precise and stabilized 10.7 mcs. output signal from IF amplifier 821, thus insuring a stabilized IF carrier signal to the output measuring section to achieve the highly selective operation of its active bandpass filter arrangement. Crystal frequency discriminator 824 has its design center frequency value at 10.7 mcs. and a linear deviation of say 50 kc.p.s. bandwidth. The DC error response output of crystal discriminator 824 passes through loop low pass filter 825 to the controller 826 input of the BWO 803. Low pass filter 825 serves to stabilize the gain of the feedback control loop. AFC tuning indicator 827 monitors the correction voltage to aid in tuning to the automatic control capture range. By subsequent frequency comparison and correction with the control loop, the frequency output of the BWO, 803, is thereby adjusted in an automatic manner by the controller 826 response to the correction voltage to bring about its frequency stabilization. Herein automatic carrier positioning is such that the extracted mean frequency value of the translated two tone type spectrum is exactly positioned at the IF carrier frequency value of 10.7 mcs. irrespective of any frequency drift exhibited by the crystal controlled local oscillator 807.

It is thus to be pointed out that the required wide frequency range and audio frequency tuning and stabilization is accomplished without use of the audio frequency operating signal section 400 in accordance with the aforedescribed method of this invention. The method and apparatus of FIG. 8 is most useful in remote test applications or in other situations wherein access to the two tone test signal generator is not readily available. Where access to the test signal source is allowed, then it becomes apparent to one experienced in the art that the difference frequency signal, $\Delta F$, can be therefrom obtained and directly applied, with suitable time delay compensation to frequency divider 815 of FIG. 8, omitting the requirement of preceding amplitude detector 811 and variable low pass filter 814 stages.

In effect the circuits arrangement of FIG. 8 when combined with the circuits arrangement of FIG. 6 results in what can be designated a wide frequency range self-governed, frequency controlled direct indicating two tone type wave analyzer.

It is here to be noted that the method and embodiment herein described and illustrated may be readily made applicable to evaluate IM distortion characteristics of any system unit or device of narrow or wide bandwidth in the frequency region from ultrasonic to and including UHF through use of a suitable range controlled frequency translation section.

It is to be again recognized that the automatic carrier positioning technique as illustrated and described may serve in various other type test areas of two tone analysis, wherein such a frequency stabilized frequency translation section would prove of beneficial value in the operational performance enhancement of the entire test equipment means used. By way of suitable example, in the undertaking of typical two tone RF frequency scanning selective spectrum analysis of intermodulation distortion characteristics when 2 tone response spectrum under analysis may be stabilized and precisely translated to the IF carrier frequency value about where the frequency scanning operation by the spectrum analyzer is to occur, a substantial improvement over conventional frequency swept, narrow band spectrum analysis will result.

It will be understood that various changes in the details, materials and arrangements of part (and steps), which have been herein described and illustrated in order to explain the nature of the invention, may be made by those skilled in the art within the principle and scope of the invention as expressed in the appended claims.

I claim:

1. A device for measuring the intermodulation distortion introduced by a system under test which comprises:
    a voltage controlled variable frequency first source of quiescent frequency $f_1$,
    a second source of frequency $f_2$, where the difference between $f_1$ and $f_2$ is $\Delta F$ an audio frequency,
    a first difference frequency converter means having its inputs connected to receive the outputs of said voltage controlled first source and said second source of frequency and producing at its output the difference audio frequency $\Delta F$,
    a source of reference audio frequency $\Delta F$ and odd multiples of $\Delta F/2$ frequency, that is $M\Delta F/2$ where $M$ is 1, 3, 5,
    phase detector means having an output and a pair of inputs, said inputs connected to receive the outputs of said reference source and said first difference frequency converter, respectively and to produce a voltage output which is dependent on the phase relationship of the inputs,
    said output of said phase detector means connected to said voltage controlled first source whereby the frequency difference between said first and second sources is maintained at $\Delta F$,
    linear summing means having a pair of inputs connected respectively to receive the outputs of said first and second sources and having its output connected to the input of said system under test,
    frequency converter means having a pair of inputs and an output,
    a variable RF source having a controlled frequency output greater by some intermediate frequency (IF) than $f_1+f_2/2$ that is $IF+f_1+f_2/2$ and a stable intermediate frequency source output (IF),
    said greater frequency $(IF+f_1+f_2)2$ output of said RF source and the response under analysis of said system connected respectively to the said inputs of said converter to produce stable translated output about said IF,
    a pair of active audio tuned selected filter channels each having a channel input and a fixed carrier input and a variable audio carrier input, and an output,
    a fixed 90° phase shift network connected to said fixed carrier input of one of said pair of filter channels,
    a second 90° phase shift network connected to said audio carrier input of one of said pair of filter channels whereby all of said carrier inputs will be in quadrature,
    said translated output of said converter connected to said pair of channel inputs,
    said other quadrature related inputs of said filter connected respectively to receive said IF output of said IF source and said odd multiple frequency output of said reference audio source,
    output indicating means connected to the outputs of said filter for indicating the amplitude of the intermodulation distortion components in accordance with selection and audio filter tuning for $M=1, 3,$ or 5 sequentially.

2. The device according to claim 1 wherein said indicating means includes,
    a linear summer connected to receive both of said filter outputs,
    a high pass filter connected to receive the $M\Delta F$ output of said summer and
    voltage amplitude measuring means connected to the output of said high pass filter.

3. An intermodulation test system having,
    a frequency stabilized translation circuit for translating a two tone test signal $f_1$ and $f_2$, and intermodulation therebetween to symmetrically locate about an intermediate frequency $f_{if}$, where $f_1+f_2/2=f_m$
    a frequency converter having a pair of inputs and an output
    an indicating means connected to said output of said frequency converter,
    a voltage controlled local frequency oscillator generating a signal at a frequency of $(f_m+f_{if})$, where $f_{if}$ is an intermediate frequency, having its output connected to one input of said converter via said indicating means,
    an amplitude limiter means connected to receive the translated output of said converter,
    a phase reversal switch means having a trigger control input,
    a source of two tone signal $f_1, f_2$, having control means for controlling the difference between $f_1 f_2$,
    means generating a trigger control signal at an audio frequency $\Delta F$ equal to the difference frequency between $f_1$ and $f_2$, said generating means connected to said control input and said control means,
    a reference crystal controlled generator of said intermediate frequency $f_{if}$,
    a phase comparator having its inputs connected to receive the outputs of said reference IF generator and said phase reversal switch means and having its output connected to control said voltage controlled local oscillator, whereby when a system under test is connected between said source of said two tone signal and said converter the intermodulation spectrum of frequencies at the output of said system will be symmetrically translated about said intermediate frequency, and thereafter stabilized in an automatic control manner.

References Cited

UNITED STATES PATENTS 2,605,396   7/1952   Cheek.
3,119,062   1/1964   Codd _____ 324—57

RUDOLPH V. ROLINEC, *Primary Examiner.*

E. E. KUBASIEWICZ, *Assistant Examiner.*